US 10,975,938 B2

(12) United States Patent
Fliearman et al.

(10) Patent No.: US 10,975,938 B2
(45) Date of Patent: Apr. 13, 2021

(54) MULTI-MODE INTEGRATED STARTER-GENERATOR DEVICE WITH ELECTROMAGNETIC ACTUATION ASSEMBLY

(71) Applicant: Deere & Company, Moline, IL (US)

(72) Inventors: Steven R. Fliearman, Coffeyville, KS (US); Lisa R. Lloyd, Independence, KS (US); Stacy K. Worley, Coffeyville, KS (US); Austin B. Stephens, Coffeyville, KS (US); Jacob E. Morris, Oologah, OK (US)

(73) Assignee: DEERE & COMPANY, Moline, IL (US)

( * ) Notice: Subject to any disclaimer, the term of this patent is extended or adjusted under 35 U.S.C. 154(b) by 149 days.

(21) Appl. No.: 16/386,020

(22) Filed: Apr. 16, 2019

(65) Prior Publication Data
US 2020/0332866 A1 Oct. 22, 2020

(51) Int. Cl.
*F16H 3/76* (2006.01)
*A01D 69/06* (2006.01)
*A01D 69/02* (2006.01)

(52) U.S. Cl.
CPC .............. *F16H 3/76* (2013.01); *A01D 69/02* (2013.01); *A01D 69/06* (2013.01); *F16H 2200/2007* (2013.01)

(58) Field of Classification Search
None
See application file for complete search history.

(56) References Cited

U.S. PATENT DOCUMENTS 3,062,073 A  11/1962  Brass
3,081,759 A   3/1963  Mauck et al.
3,150,544 A   9/1964  Brass
(Continued)

FOREIGN PATENT DOCUMENTS

DE  69218975 T2  6/1994
DE  19745995 A1  9/1998
(Continued)

OTHER PUBLICATIONS

USPTO Non-Final Office Action dated Jun. 19, 2020 for Utility U.S. Appl. No. 16/386,075.
(Continued)

*Primary Examiner* — Colby M Hansen
(74) *Attorney, Agent, or Firm* — Klintworth & Rozenblat IP LLP

(57) ABSTRACT

A combination starter-generator device is provided for a work vehicle having an engine. The starter-generator device includes an electric machine; a gear set configured to couple the electric machine and the engine in first and second power flow directions, the gear set configured to operate in one of at least first, second, and third gear ratios in the first power flow direction and at least a fourth gear ratio in the second power flow direction; at least one clutch selectively coupled to the gear set to effect the first, second, and third gear ratios in the first power flow direction and the fourth gear ratio in the second power flow direction; and an actuator assembly including at least one electromagnet configured to selectively shift the at least one clutch between disengaged and engaged positions.

20 Claims, 12 Drawing Sheets

(56) References Cited

U.S. PATENT DOCUMENTS

| | | | |
|---|---|---|---|
| 3,640,152 A | 2/1972 | Shirai et al. | |
| 3,675,511 A | 7/1972 | Wakamatsu et al. | |
| 3,942,024 A * | 3/1976 | Ingham | F02N 11/0811 |
| | | | 290/38 R |
| 4,122,354 A * | 10/1978 | Howland | F02N 11/04 |
| | | | 290/31 |
| 4,213,299 A * | 7/1980 | Sharar | F01K 13/00 |
| | | | 122/4 A |
| 4,473,752 A * | 9/1984 | Cronin | F02N 11/04 |
| | | | 123/179.27 |
| 4,484,495 A | 11/1984 | Mason | |
| 4,631,455 A * | 12/1986 | Taishoff | H02K 7/065 |
| | | | 318/37 |
| 4,708,030 A * | 11/1987 | Cordner | F02C 7/268 |
| | | | 192/3.52 |
| 4,750,384 A | 6/1988 | Belliveau | |
| 4,862,009 A | 8/1989 | Ing | |
| 4,926,713 A | 5/1990 | Madill | |
| 5,033,994 A | 7/1991 | Nu | |
| 5,177,968 A * | 1/1993 | Fellows | F01B 1/062 |
| | | | 60/517 |
| 5,418,400 A * | 5/1995 | Stockton | F02N 11/04 |
| | | | 290/22 |
| 5,558,173 A | 9/1996 | Sherman | |
| 5,856,709 A | 1/1999 | Ibaraki et al. | |
| 6,371,877 B1 | 4/2002 | Schroeder et al. | |
| 6,378,479 B1 | 4/2002 | Nishidate et al. | |
| RE37,743 E | 6/2002 | Yang | |
| 6,409,622 B1 | 6/2002 | Bolz et al. | |
| 6,484,596 B2 | 11/2002 | Puchas | |
| 6,569,054 B2 | 5/2003 | Kato | |
| 6,582,333 B2 | 6/2003 | Man | |
| 6,661,109 B2 | 12/2003 | Fukasaku et al. | |
| 6,746,354 B1 | 6/2004 | Ziemer | |
| 6,770,005 B2 | 8/2004 | Aikawa et al. | |
| 6,832,970 B2 | 12/2004 | Eibler | |
| 6,852,063 B2 | 2/2005 | Takahashi et al. | |
| 6,910,453 B2 | 6/2005 | Sugino et al. | |
| 6,965,173 B2 | 11/2005 | Fukasaku et al. | |
| 7,028,794 B2 | 4/2006 | Odahara et al. | |
| 7,044,255 B2 | 5/2006 | Maeda et al. | |
| 7,086,978 B2 | 8/2006 | Aikawa et al. | |
| 7,117,965 B2 | 10/2006 | Yatabe et al. | |
| 7,223,191 B2 | 5/2007 | Aikawa et al. | |
| 7,374,031 B2 | 5/2008 | Skorucak | |
| 7,387,043 B2 | 6/2008 | Sakamoto et al. | |
| 7,503,871 B2 | 3/2009 | Ozarekar et al. | |
| 7,582,033 B2 | 9/2009 | Kefti-Cherif et al. | |
| 7,753,147 B2 | 7/2010 | Usoro | |
| 7,780,562 B2 | 8/2010 | King et al. | |
| 8,143,735 B2 | 3/2012 | Bauer | |
| 8,226,517 B2 | 7/2012 | Tsai et al. | |
| 8,235,859 B2 | 8/2012 | Yun | |
| 8,480,529 B2 | 7/2013 | Pohl et al. | |
| 8,500,601 B2 | 8/2013 | Arnold et al. | |
| 8,584,359 B1 | 11/2013 | Bowman | |
| 8,727,944 B2 | 5/2014 | Noboru et al. | |
| 8,734,281 B2 | 5/2014 | Ai et al. | |
| 8,996,227 B2 * | 3/2015 | Sisk | B60L 58/20 |
| | | | 701/26 |
| 9,017,207 B2 | 4/2015 | Pohl et al. | |
| 9,074,656 B2 | 7/2015 | Benz et al. | |
| 9,145,136 B2 | 9/2015 | Suntharalingam et al. | |
| 9,184,646 B2 | 11/2015 | Fulton | |
| 9,261,064 B2 | 2/2016 | Patel et al. | |
| 9,371,810 B2 | 6/2016 | Creviston | |
| 9,421,855 B2 | 8/2016 | Suntharalingam et al. | |
| 9,541,172 B1 | 1/2017 | Wright | |
| 9,555,795 B2 | 1/2017 | Nefcy et al. | |
| 9,676,265 B2 | 6/2017 | Choi | |
| 9,726,282 B2 | 8/2017 | Pohl et al. | |
| 10,183,569 B2 | 1/2019 | Toyota et al. | |
| 10,479,187 B2 | 11/2019 | Lubben et al. | |
| 10,518,626 B2 | 12/2019 | Pettersson | |
| 10,591,025 B2 | 3/2020 | Fliearman et al. | |
| 10,619,711 B2 | 4/2020 | Fliearman et al. | |
| 2001/0019210 A1 | 9/2001 | Fukasaku et al. | |
| 2001/0025621 A1 * | 10/2001 | Shiraishi | B60W 10/06 |
| | | | 123/305 |
| 2001/0042649 A1 | 11/2001 | Maeda et al. | |
| 2002/0019284 A1 | 2/2002 | Aikawa et al. | |
| 2002/0033059 A1 | 3/2002 | Pels et al. | |
| 2002/0117860 A1 | 8/2002 | Man et al. | |
| 2002/0139592 A1 | 10/2002 | Fukasaku et al. | |
| 2002/0177504 A1 | 11/2002 | Pels et al. | |
| 2003/0001391 A1 | 1/2003 | Kuang et al. | |
| 2003/0104900 A1 | 6/2003 | Takahashi | |
| 2003/0224888 A1 | 12/2003 | Wilder et al. | |
| 2004/0055800 A1 | 3/2004 | Katou et al. | |
| 2004/0116226 A1 | 6/2004 | Baker et al. | |
| 2006/0111211 A1 | 5/2006 | Kefti-Cherif et al. | |
| 2006/0166777 A1 | 7/2006 | Aikawa et al. | |
| 2007/0108006 A1 | 5/2007 | Schmid et al. | |
| 2007/0157899 A1 | 7/2007 | Seufert et al. | |
| 2007/0265126 A1 | 11/2007 | Janson et al. | |
| 2008/0179119 A1 | 7/2008 | Grenn et al. | |
| 2008/0314195 A1 | 12/2008 | Andoh et al. | |
| 2009/0055061 A1 | 2/2009 | Zhu | |
| 2009/0176611 A1 | 7/2009 | Avery | |
| 2009/0264241 A1 | 10/2009 | Dittrich et al. | |
| 2009/0312145 A1 | 12/2009 | Pohl et al. | |
| 2010/0029428 A1 | 2/2010 | Abe et al. | |
| 2010/0044183 A1 | 2/2010 | Guggolz et al. | |
| 2010/0048338 A1 | 2/2010 | Si | |
| 2010/0063704 A1 | 3/2010 | Okubo et al. | |
| 2010/0076634 A1 | 3/2010 | Brigham | |
| 2011/0010031 A1 | 1/2011 | Syed et al. | |
| 2011/0015020 A1 | 1/2011 | Grosser | |
| 2011/0053729 A1 | 3/2011 | Parsons et al. | |
| 2011/0070999 A1 | 3/2011 | Soliman et al. | |
| 2011/0263379 A1 | 10/2011 | Liang et al. | |
| 2012/0103293 A1 | 5/2012 | Robinette et al. | |
| 2012/0235473 A1 | 9/2012 | Jiang et al. | |
| 2012/0240723 A1 | 9/2012 | Gluckler et al. | |
| 2013/0046427 A1 | 2/2013 | Hohenberg | |
| 2013/0252773 A1 | 9/2013 | Suntharalingam et al. | |
| 2013/0316873 A1 | 11/2013 | Jansen et al. | |
| 2014/0011619 A1 | 1/2014 | Pohl et al. | |
| 2014/0137824 A1 | 5/2014 | Jacques et al. | |
| 2014/0150604 A1 | 6/2014 | Kaltenbach | |
| 2014/0256490 A1 | 9/2014 | Honda | |
| 2015/0226323 A1 | 8/2015 | Pohl et al. | |
| 2015/0239335 A1 | 8/2015 | Wachter et al. | |
| 2016/0031438 A1 | 2/2016 | Matsui et al. | |
| 2016/0031439 A1 | 2/2016 | Nefcy et al. | |
| 2016/0052382 A1 | 2/2016 | Clark et al. | |
| 2016/0076629 A1 | 3/2016 | Modrzejewski et al. | |
| 2016/0082821 A1 | 3/2016 | Mueller et al. | |
| 2016/0096522 A1 | 4/2016 | Ortmann et al. | |
| 2016/0137045 A1 | 5/2016 | Zhu et al. | |
| 2016/0200311 A1 | 7/2016 | Nefcy et al. | |
| 2016/0207525 A1 | 7/2016 | Nefcy et al. | |
| 2016/0258495 A1 | 9/2016 | Bird | |
| 2016/0288780 A1 | 10/2016 | Shukla et al. | |
| 2016/0348741 A1 | 12/2016 | Niemiec et al. | |
| 2017/0248196 A1 | 8/2017 | Turner et al. | |
| 2017/0328470 A1 | 11/2017 | Pohl et al. | |
| 2017/0368925 A1 | 12/2017 | Maki | |
| 2018/0100564 A1 | 4/2018 | Fliearman et al. | |
| 2018/0106365 A1 | 4/2018 | Tsukizaki et al. | |
| 2018/0172124 A1 | 6/2018 | Valente et al. | |
| 2018/0186230 A1 | 7/2018 | Fukuda et al. | |
| 2018/0236864 A1 | 8/2018 | Imamura et al. | |
| 2018/0238443 A1 | 8/2018 | Aulin et al. | |
| 2018/0244145 A1 | 8/2018 | Ohnemus et al. | |
| 2018/0298993 A1 | 10/2018 | Fliearman et al. | |
| 2019/0084555 A1 | 3/2019 | Omura et al. | |
| 2019/0160936 A1 | 5/2019 | Lubben et al. | |
| 2019/0176806 A1 | 6/2019 | Trent | |
| 2019/0219022 A1 | 7/2019 | Palil et al. | |

(56) References Cited

U.S. PATENT DOCUMENTS

| | | | |
|---|---|---|---|
| 2019/0344655 | A1 | 11/2019 | Pettersson |
| 2019/0351751 | A1 | 11/2019 | Sato et al. |

FOREIGN PATENT DOCUMENTS

| | | |
|---|---|---|
| DE | 19927521 A1 | 6/2000 |
| DE | 19911924 A1 | 9/2000 |
| DE | 19923316 A1 | 11/2000 |
| DE | 10003741 A1 | 4/2001 |
| DE | 010007959 A1 | 8/2001 |
| DE | 102006037576 A1 | 4/2008 |
| DE | 102010030570 A1 | 12/2011 |
| DE | 102010030571 A1 | 12/2011 |
| DE | 102010060140 A1 | 4/2012 |
| DE | 102011080068 A1 | 1/2013 |
| DE | 102011089708 A1 | 6/2013 |
| DE | 102011089709 A1 | 6/2013 |
| DE | 102011089710 A1 | 6/2013 |
| DE | 112011103973 T5 | 10/2013 |
| DE | 102008045202 B4 | 3/2014 |
| DE | 102013203009 A1 | 8/2014 |
| DE | 102013012747 A1 | 9/2014 |
| DE | 102013206970 A1 | 10/2014 |
| DE | 102014200720 A1 | 2/2015 |
| DE | 102014200723 B3 | 2/2015 |
| DE | 102013219948 | 4/2015 |
| DE | 102017203026 A1 | 8/2017 |
| DE | 102017204269 A1 | 9/2017 |
| EP | 0645271 B1 | 3/1995 |
| EP | 1069310 A2 | 1/2001 |
| EP | 2272702 A2 | 1/2011 |
| EP | 2664785 | 11/2013 |
| GB | 0650564 | 2/1951 |
| JP | 2015116004 A | 6/2015 |
| WO | 0188369 A1 | 11/2001 |
| WO | 200700107458 A2 | 9/2007 |

OTHER PUBLICATIONS

USPTO Non-Final Office Action dated Mar. 4, 2020 for Utility U.S. Appl. No. 16/385,934.

USPTO non-final office action issued in pending Utility U.S. Appl. No. 16/386,052 dated Oct. 30, 2020.

Harmonic Drive LLC, Harmonic Planetary Precision Gearing & Motion Control, Product Brochure, Mar. 2006.

NTN Automotive Sales Headquarters, Compact Clutch Integrated Pulley for Alternators, NTN Technical Review No. 75, 2007.

North Atalantic Starter, Starter Drives Explained, Northatlan.com, 2005.

Deere & Company, Utility U.S. Appl. No. 15/825,520 filed Nov. 29, 2017.

Ioan-Adrian Viorel et al., Integrated Starter-Generators for Automotive Applications, Technical University of Cluj—Romania, Dept. of Electrical Machines, vol. 45, No. 3, 2004.

German Search Report issued in German Application No. 102020204706.5 dated Sep. 3, 2020. (7 pages).

German Search Report issued in German Application No. 102020204795.2 dated Sep. 2, 2020. (7 pages).

German Search Report issued in German Application No. 102020204705.7 dated Sep. 1, 2020. (6 pages).

German Search Report issued in German Application No. 102020204642.5 dated Sep. 4, 2020. (8 pages).

German Search Report issued in German Application No. 102020204943.3 dated Sep. 4, 2020. (7 pages).

German Search Report issued in German Application No. 102020204704.9 dated Sep. 3, 2020. (7 pages).

German Search Report issued in German Application No. 102020203063.4 dated Sep. 4, 2020. (6 pages).

German Search Report issued in German Application No. 102020204646.8 dated Sep. 1, 2020. (6 pages).

German Search Report for application No. 1020182214956 dated May 28, 2019.

German Search Report for application No. 1020172030267 dated Aug. 4, 2017.

Deere & Company, Multi-Mode Integrated Starter-Generator Device, Utility U.S. Appl. No. 16/385,860, filed Apr. 16, 2019.

Deere & Company, Multi-Mode Integrated Starter-Generator Device With Preloaded , Clutch, Utility U.S. Appl. No. 16/385,892, filed Apr. 16, 2019.

Deere & Company, Multi-Mode Integrated Starter-Generator Device With Magnetic CAM Assembly, Utility U.S. Appl. No. 16/385,934, filed Apr. 16, 2019.

Deere & Company, Multi-Mode Integrated Starter-Generator Device With CAM Arrangement, Utility U.S. Appl. No. 16/385,964, filed Apr. 16, 2019.

Deere & Company, Multi-Mode Integrated Starter-Generator Device With Dog Clutch Arrangement, Utility U.S. Appl. No. 16/385,989, filed Apr. 16, 2019.

Deere & Company, Multi-Mode Starter-Generator Device Transmission With Single Valve Control, Utility U.S. Appl. No. 16/386,001, filed Apr. 16, 2019.

Deere & Company, Multi-Mode Integrated Starter-Generator Device With Preloaded Clutch, Utility U.S. Appl. No. 16/385,784, filed Apr. 16, 2019.

Deere & Company, Multi-Mode Integrated Starter-Generator Device With Transmission Assembly Mounting Arrangement,Utility U.S. Appl. No. 16/386,052, filed Apr. 16, 2019.

Deere & Company, Multi-Mode Integrated Starter-Generator Device With Solenoid CAM Actuation Apparatus, Utility U.S. Appl. No. 16/386,075, filed Apr. 16, 2019.

USPTO Non-Final Office Action dated Sep. 9, 2019 for Utility U.S. Appl. No. 15/834,356.

USPTO Non-Final Office Action dated Feb. 25, 2019 for Utility U.S. Appl. No. 15/834,356.

USPTO Non-Final Office Action dated Nov. 1, 2018 for Utility U.S. Appl. No. 15/825,520.

USPTO Non-Final Office Action dated Nov. 2, 2017 for Utility U.S. Appl. No. 15/056,767.

USPTO Final Office Action dated Mar. 8, 2019 for Utility U.S. Appl. No. 15/056,767.

USPTO Final Office Action dated Jun. 11, 2018 for Utility U.S. Appl. No. 15/056,767.

USPTO Non-Final Office Action dated Sep. 28, 2018 for Utility U.S. Appl. No. 15/056,767.

German Search Report for application No. 1020182189080 dated May 27, 2019.

German Search Report for application No. 1020182180784 dated Jun. 4, 2019.

USPTO Non-Final Office Action dated Aug. 24, 2020 for Utility U.S. Appl. No. 16/385,964.

USPTO Non-Final Office Action dated Aug. 24, 2020 for Utility U.S. Appl. No. 16/385,784.

USPTO non-final office action issued in pending U.S. Appl. No. 16/385,860 dated Nov. 4, 2020.

\* cited by examiner

MULTI-MODE INTEGRATED STARTER-GENERATOR DEVICE WITH ELECTROMAGNETIC ACTUATION ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle power systems, including arrangements for starting mechanical power equipment and generating electric power therefrom.

BACKGROUND OF THE DISCLOSURE

Work vehicles, such as those used in the agriculture, construction and forestry industries, and other conventional vehicles may be powered by an internal combustion engine (e.g., a diesel engine), although it is becoming more common for mixed power sources (e.g., engines and electric motors) to be employed. In any case, engines remain the primary power sources of work vehicles and require mechanical input from a starter to initiate rotation of the crankshaft and reciprocation of the pistons within the cylinders. Torque demands for starting an engine are high, particularly so for large diesel engines common in heavy-duty machines.

Work vehicles additionally include subsystems that require electric power. To power these subsystems of the work vehicle, a portion of the engine power may be harnessed using an alternator or generator to generate AC or DC power. The battery of the work vehicle is then charged by inverting the current from the alternator. Conventionally, a belt, direct or serpentine, couples an output shaft of the engine to the alternator to generate the AC power. Torque demands for generating current from the running engine are significantly lower than for engine start-up. In order to appropriately transfer power between the engine and battery to both start the engine and generate electric power, a number of different components and devices are typically required, thereby raising issues with respect to size, cost, and complexity.

SUMMARY OF THE DISCLOSURE

This disclosure provides a combined engine starter and electric power generator device with an integral transmission, such as may be used in work vehicles for engine cold start and to generate electric power, thus serving the dual purposes of an engine starter and an alternator with more robust power transmission to and from the engine in both cases.

In one aspect, the disclosure provides a combination starter-generator device for a work vehicle having an engine. The starter-generator device includes an electric machine; a gear set configured to receive rotational input from the electric machine and from the engine and to couple the electric machine and the engine in a first power flow direction and a second power flow direction, the gear set configured to operate in one of at least a first gear ratio, a second gear ratio, or a third gear ratio in the first power flow direction and at least a fourth gear ratio in the second power flow direction; at least one clutch selectively coupled to the gear set to effect the first, second, and third gear ratios in the first power flow direction and the fourth gear ratio in the second power flow direction; and an actuator assembly including at least one electromagnet configured to selectively shift the at least one clutch from a disengaged position in which the at least one clutch is decoupled from the gear set into an engaged position in which the at least one clutch is coupled to the gear set.

In another aspect, the disclosure provides a drivetrain assembly for a work vehicle. The drivetrain assembly includes an engine; an electric machine; a gear set configured to receive rotational input from the electric machine and from the engine and to couple the electric machine and the engine in a first power flow direction and a second power flow direction, the gear set configured to operate in one of at least a first gear ratio, a second gear ratio, or a third gear ratio in the first power flow direction and at least the third gear ratio in the second power flow direction; at least one clutch selectively coupled to the gear set to effect the first, second, and third gear ratios in the first power flow direction and the fourth gear ratio in the second power flow direction; at least one permanent magnet mounted on the at least one clutch; and an actuator assembly including a cam plate that is generally disc-shaped with a first cam plate face and a second cam plate face, opposite the first cam plate face and oriented towards the at least one clutch. The cam plate includes the at least one electromagnet configured selectively shift the at least one clutch between a disengaged position in which the at least one clutch is decoupled from the gear set into an engaged position in which the at least one clutch is coupled to the gear set. The drivetrain assembly further includes a controller coupled to the at least one electromagnet to selectively energize the at least one electromagnet in a first energized state to generate an opposite orientation magnetic field relative to the at least one permanent magnet such that the at least one permanent magnet is attracted to the at least one electromagnet and a second energized state to generate a common orientation magnetic field relative to the at least one permanent magnet such that the at least one permanent magnet is repelled by the at least one electromagnet.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
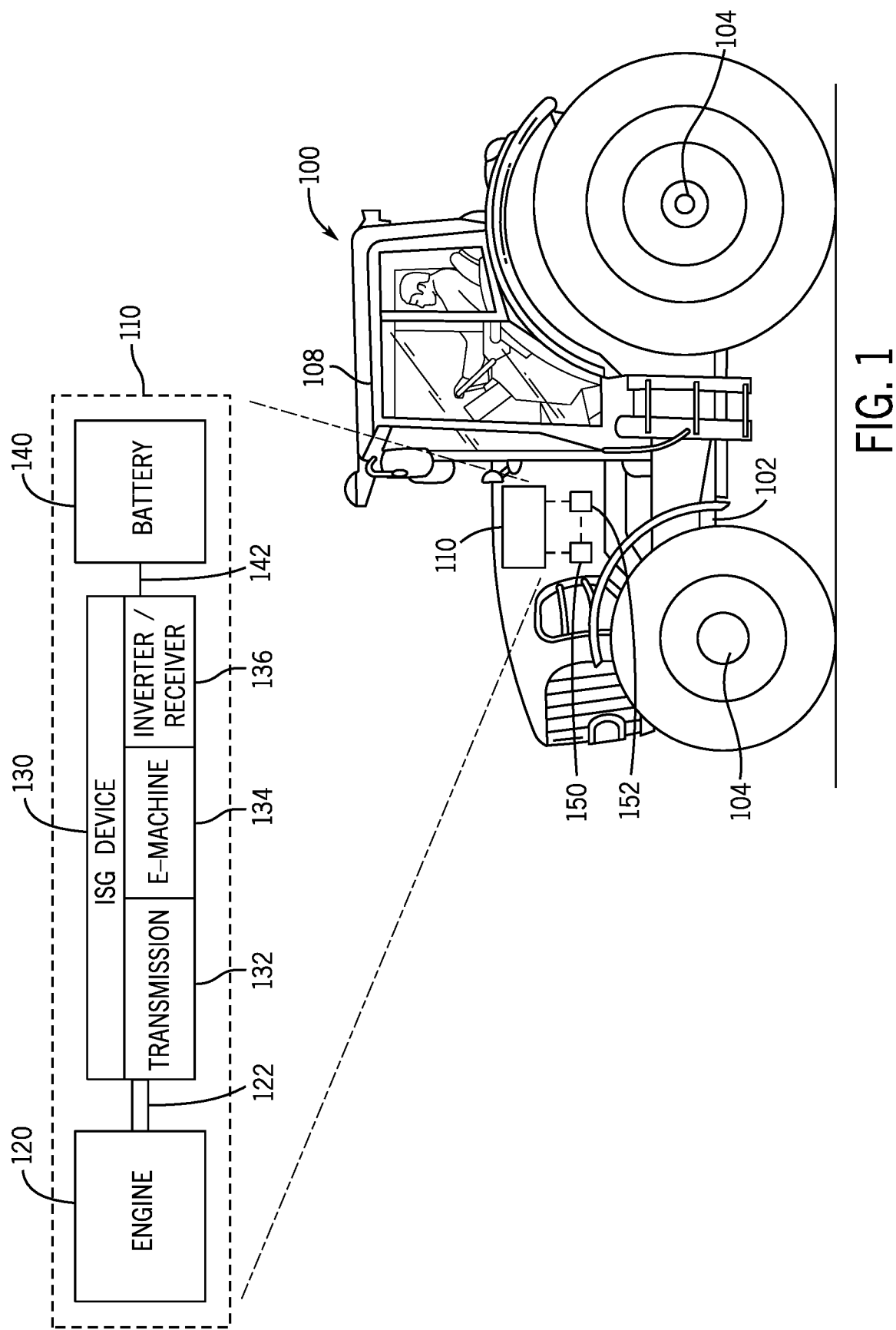
FIG. 1 is a schematic side view of an example work vehicle in the form of an agricultural tractor in which the disclosed integrated starter-generator device may be used.

The following describes one or more example embodiments of the disclosed starter-generator device, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Many conventional vehicle power systems include an internal combustion engine and/or one or more batteries (or other chemical power source) that power various components and subsystems of the vehicle. In certain electric vehicles, a bank of batteries powers the entire vehicle including the drive wheels to impart motion to the vehicle. In hybrid gas and electric vehicles, the motive force may alternate between engine and electric motor power, or the engine power may be supplemented by electric motor power. In still other conventional vehicles, the electric power system is used to initiate engine start up and to run the non-drive electric systems of the vehicle. In the latter case, the vehicle typically has a starter motor that is powered by the vehicle battery to turn the engine crankshaft to move the pistons within the cylinders. In further scenarios, the electric power system may provide a boost to an operating engine.

Some engines (e.g., diesel engines) initiate combustion by compression of the fuel, while other engines rely on a spark generator (e.g., spark plug), which is powered by the battery. Once the engine is operating at a sufficient speed, the power system may harvest the engine power to power the electric system as well as to charge the battery. Typically, this power harvesting is performed with an alternator or other type of power generator. The alternator converts alternating current (AC) power to direct current (DC) power usable by the battery and vehicle electric components by passing the AC power through an inverter (e.g., diode rectifier). Conventional alternators harness power from the engine by coupling a rotor of the alternator to an output shaft of the engine (or a component coupled thereto). Historically this was accomplished by the use of a dedicated belt, but in some more modern vehicles the alternator is one of several devices that are coupled to (and thus powered by) the engine via a single "serpentine" belt.

In certain applications, such as in certain heavy-duty machinery and work vehicles, it may be disadvantageous to have a conventional set-up with separate starter and generator components. Such separate components require separate housings, which may require separate sealing or shielding from the work environment and/or occupy separate positions within the limited space of the engine compartment. Other engine compartment layout complexities may arise as well.

The following describes one or more example implementations of an improved vehicle power system that addresses one or more of these (or other) matters with conventional systems. In one aspect, the disclosed system includes a combination or integrated device that performs the engine cranking function of a starter motor and the electric power generating function of a generator. The device is referred to herein as an integrated starter-generator device ("ISG" or "starter-generator"). This terminology is used herein, at least in some implementations of the system, to be agnostic to the type of power (i.e., AC or DC current) generated by the device. In some implementations, the starter-generator device may function to generate electricity in a manner of what persons of skill in the art may consider a "generator" device that produces DC current directly. However, as used herein, the term "generator" shall mean producing electric power of static or alternating polarity (i.e., AC or DC). Thus, in a special case of the starter-generator device, the electric power generating functionality is akin to that of a conventional alternator, and it generates AC power that is subsequently rectified to DC power, either internally or externally to the starter-generator device.

In certain embodiments, the starter-generator device may include a direct mechanical power coupling to the engine that avoids the use of belts between the engine and the starter-generator device. For example, the starter-generator device may include within its housing a power transmission assembly with a gear set that directly couples to an output shaft of the engine. The gear set may take any of various forms including arrangements with enmeshing spur or other gears as well as arrangements with one or more planetary gear sets. Large gear reduction ratios may be achieved by the transmission assembly such that a single electric machine (i.e., motor or generator) may be used and operated at suitable speeds for one or more types of engine start up, as well as electric power generation. The direct power coupling between the starter-generator device and engine may increase system reliability, cold starting performance, and electric power generation of the system.

Further, in certain embodiments, the starter-generator device may have a power transmission assembly that automatically and/or selectively shifts gear ratios (i.e., shifts between power flow paths having different gear ratios). By way of example, the transmission assembly may include one or more passive or active engagement components that engage or disengage to effect power transmission through a power flow path. In this manner, bi-directional or other clutch (or other) configurations may be employed to carry out the cranking and generating functions with the appropriate control hardware. As a result of the bi-directional nature of the power transmission assembly, the power transfer belt arrangement may be implemented with only a single belt tensioner, thereby providing a relatively compact and simple assembly. In addition to providing torque in two different power flow directions, the gear set may also be configured and arranged to provide power transmission from the electric machine to the engine at one of two different speeds, e.g., according to different gear ratios. The selection of speed may provide additional functionality and flexibility for the power transmission assembly.

In one example, the combination starter-generator may further include a clutch arrangement with first, second, and third clutches that are actuated with electromagnets mounted on a cam plate of a cam actuator assembly. In one example, one or more of the clutches may have permanent magnets that interact with corresponding electromagnets on the cam plate based on the nature of the current supplied to the electromagnets. In this manner, the clutches are repelled and attracted relative to the cam plate to axially shift between engaged and disengaged positions, thereby modifying the power flow within the power transmission assembly.

Each implementation will be discussed in greater detail below.

Referring to the drawings, an example work vehicle power system as a drivetrain assembly will be described in detail. As will become apparent from the discussion herein, the disclosed system may be used advantageously in a variety of settings and with a variety of machinery. For example, referring now to FIG. 1, the power system (or drivetrain assembly) 110 may be included in a work vehicle 100, which is depicted as an agricultural tractor. It will be understood, however, that other configurations may be possible, including configurations with work vehicle 100 as a different kind of tractor, or as a work vehicle used for other aspects of the agriculture industry or for the construction and forestry industries (e.g., a harvester, a log skidder, a motor grader, and so on). It will further be understood that aspects of the power system 110 may also be used in non-work vehicles and non-vehicle applications (e.g., fixed-location installations).

Briefly, the work vehicle 100 has a main frame or chassis 102 supported by ground-engaging wheels 104, at least the front wheels of which are steerable. The chassis 102 supports the power system (or plant) 110 and an operator cabin 108 in which operator interface and controls (e.g., various joysticks, switches levers, buttons, touchscreens, keyboards, speakers and microphones associated with a speech recognition system) are provided.

As schematically shown, the power system 110 includes an engine 120, an integrated starter-generator device 130, a battery 140, and a controller 150. The engine 120 may be an internal combustion engine or other suitable power source that is suitably coupled to propel the work vehicle 100 via the wheels 104, either autonomously or based on commands from an operator. The battery 140 may represent any one or more suitable energy storage devices that may be used to provide electric power to various systems of the work vehicle 100.

The starter-generator device 130 couples the engine 120 to the battery 140 such that the engine 120 and battery 140 may selectively interact in at least four modes. In a first (or cold engine start) mode, the starter-generator device 130 converts electric power from the battery 140 into mechanical power to drive the engine 120 at a first gear ratio corresponding to a relatively high speed, e.g., during a relatively cold engine start up. In a second (or warm engine start) mode, the starter-generator device 130 converts electric power from the battery 140 into mechanical power to drive the engine 120 at a second gear ratio corresponding to a relatively low speed, e.g., during a relatively warm engine start up. In a third (or boost) mode, the starter-generator device 130 converts electric power from the battery 140 into mechanical power at a third gear ratio corresponding to a relatively low speed to drive the engine 120 for an engine boost. In a fourth (or generation) mode, the starter-generator device 130 converts mechanical power at a fourth (or the third) gear ratio from the engine 120 into electric power to charge the battery 140. Additional details regarding operation of the starter-generator device 130 during the engine start modes, the boost mode, and the generation mode are provided below.

As introduced above, the controller 150 may be considered part of the power system 110 to control various aspects of the work vehicle 100, particularly characteristics of the power system 110. The controller 150 may be a work vehicle electronic controller unit (ECU) or a dedicated controller. In some embodiments, the controller 150 may be configured to receive input commands and to interface with an operator via a human-machine interface or operator interface (not shown) and from various sensors, units, and systems onboard or remote from the work vehicle 100; and in response, the controller 150 generates one or more types of commands for implementation by the power system 110 and/or various systems of work vehicle 100. In one example and as discussed in greater detail below, the controller 150 may command current to electromagnets associated with an actuator assembly to engage and/or disengage the clutches within the starter-generator device 130. Other mechanisms for controlling such clutches may also be provided.

Generally, the controller 150 may be configured as computing devices with associated processor devices and memory architectures, as hydraulic, electrical or electro-hydraulic controllers, or otherwise. As such, the controller 150 may be configured to execute various computational and control functionality with respect to the power system 110 (and other machinery). The controller 150 may be in electronic, hydraulic, or other communication with various other systems or devices of the work vehicle 100. For example, the controller 150 may be in electronic or hydraulic communication with various actuators, sensors, and other devices within (or outside of) the work vehicle 100, including various devices associated with the power system 110. Generally, the controller 150 generates the command signals based on operator input, operational conditions, and routines and/or schedules stored in the memory. For example, the operator may provide inputs to the controller 150 via an operator input device that dictates the appropriate mode, or that at least partially defines the operating conditions in which the appropriate mode is selected by the controller 150. In some examples, the controller 150 may additionally or alternatively operate autonomously without input from a human operator. The controller 150 may communicate with other systems or devices (including other controllers) in various known ways, including via a CAN bus (not shown), via wireless or hydraulic communication means, or otherwise.

Additionally, power system 110 and/or work vehicle 100 may include a hydraulic system 152 with one or more electro-hydraulic control valves (e.g., solenoid valves) that facilitate hydraulic control of various vehicle systems, particularly aspects of the starter-generator device 130. The hydraulic system 152 may further include various pumps, lines, hoses, conduits, tanks, and the like. The hydraulic system 152 may be electrically activated and controlled according to signals from the controller 150.

In one example, the starter-generator device 130 includes a power transmission assembly (or transmission) 132, an electric machine or motor 134, and an inverter/rectifier device 136, each of which may be operated according to command signals from the controller 150. The power transmission assembly 132 enables the starter-generator device 130 to interface with the engine 120, particularly via a crank shaft 122 or other power transfer element of the engine 120, such as an auxiliary drive shaft. The power transmission assembly 132 may include one or more gear sets in various configurations to provide suitable power flows and gear reductions, as described below. The power transmission assembly 132 variably interfaces with the electric machine 134 in two different power flow directions such that the electric machine 134 operates as a motor during the engine start and boost modes and as a generator during the generation mode. In one example, discussed below, the power transmission assembly 132 is coupled to the electric machine 134 via a power transfer belt arrangement. This arrangement, along with the multiple gear ratios provided by the power transmission assembly 132, permits the electric machine 134 to operate within optimal speed and torque ranges in both power flow directions. The inverter/rectifier device 136 enables the starter-generator device 130 to interface with the battery 140, such as via direct hardwiring or a vehicle power bus 142. In one example, the inverter/rectifier device 136 inverts DC power from the battery 140 into AC power during the engine start modes and rectifies AC power to DC power in the generation mode. In some embodiments, the inverter/rectifier device 136 may be a separate component instead of being incorporated into the starter-generator device 130. Although not shown, the power system 110 may also include a suitable voltage regulator, either incorporated into the starter-generator device 130 or as a separate component.

Figure 2:
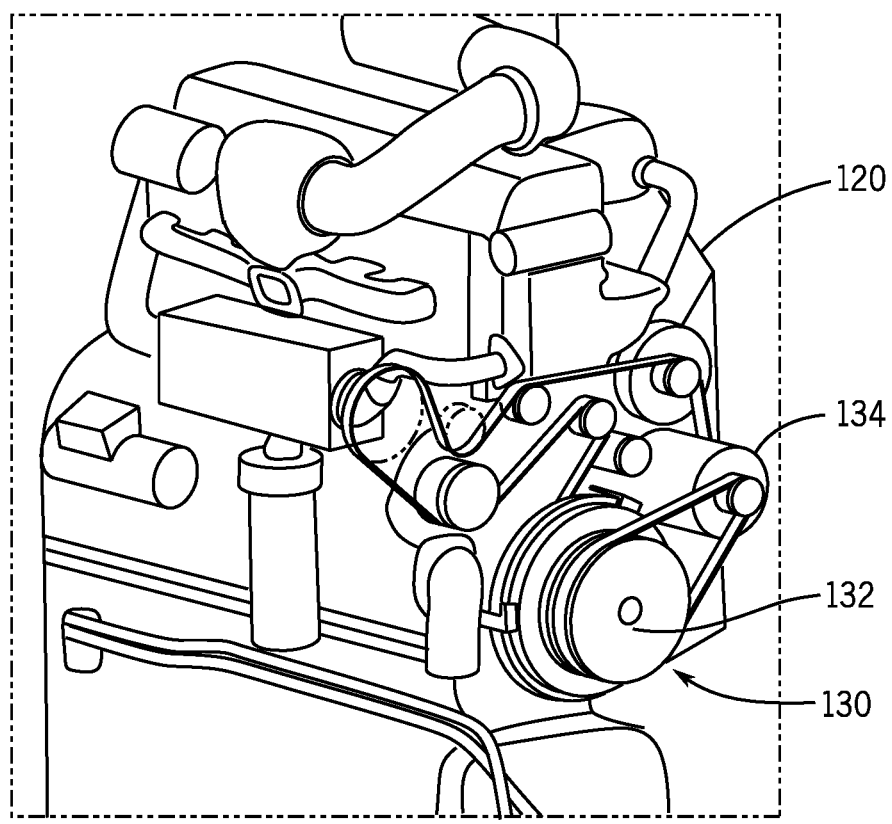
FIG. 2 is a simplified partial isometric view of an engine of the work vehicle of FIG. 1 showing an example mounting location for an example starter-generator device.

Reference is briefly made to FIG. 2, which depicts a simplified partial isometric view of an example mounting location of the starter-generator device 130 relative to the engine 120. In this example, the integrated starter-generator device 130 mounts directly and compactly to the engine 120 so as not to project significantly from the engine 120 (and thereby enlarge the engine compartment space envelope) or interfere with various plumbing lines and access points (e.g., oil tubes and fill opening and the like). Notably, the starter-generator device 130 may generally be mounted on or near the engine 120 in a location suitable for coupling to an engine power transfer element (e.g., a crank shaft 122 as introduced in FIG. 1).

Figure 3:
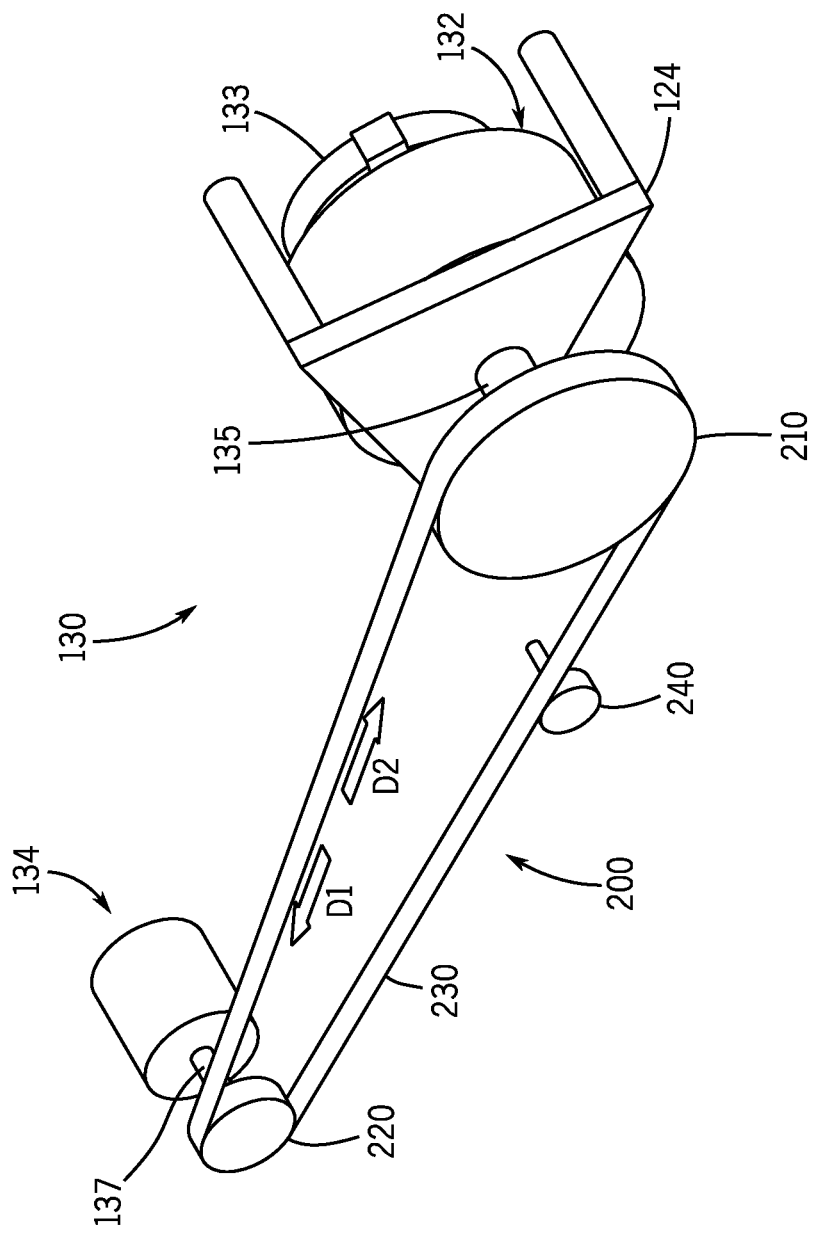
FIG. 3 is a schematic diagram of a portion of a power transfer arrangement of the work vehicle of FIG. 1 having an example starter-generator device.

Reference is additionally made to FIG. 3, which is a simplified schematic diagram of a power transfer belt arrangement 200 between the power transmission assembly 132 and electric machine 134 of the starter-generator device 130. It should be noted that FIGS. 2 and 3 depict one example physical integration or layout configuration of the starter-generator device 130. Other arrangements may be provided.

The power transmission assembly 132 is mounted to the engine 120 and may be supported by a reaction plate 124. As shown, the power transmission assembly 132 includes a first power transfer element 133 that is rotatably coupled to a suitable drive element of the engine 120 (e.g., crank shaft 122 of FIG. 1) and a second power transfer element 135 in the form of a shaft extending on an opposite side of the power transmission assembly 132 from the first power transfer element 133. Similarly, the electric machine 134 is mounted on the engine 120 and includes a further power transfer element 137.

The power transfer belt arrangement 200 includes a first pulley 210 arranged on the second power transfer element 135 of the power transmission assembly 132, a second pulley 220 arranged on the power transfer element 137 of the electric machine 134, and a belt 230 that rotatably couples the first pulley 210 to the second pulley 220 for collective rotation. As described in greater detail below, during the engine start modes, the electric machine 134 pulls the belt 230 to rotate pullies 210, 220 in a first clock direction D1 to drive the power transmission assembly 132 (and thus the engine 120); during the boost mode, the electric machine 134 pulls the belt 230 to rotate pullies 210, 220 in a second clock direction D2 to drive the power transmission assembly 132 (and thus the engine 120); and during the generation mode, the power transmission assembly 132 enables the engine 120 to pull the belt 230 and rotate pullies 210, 220 in the second clock direction D2 to drive the electric machine 134.

As a result of the bi-directional configuration, the power transfer belt arrangement 200 may include only a single belt tensioner 240 to apply tension to a single side of the belt 230 in both directions D1, D2. Using a single belt tensioner 240 to tension the belt 230 is advantageous in that it reduces parts and complexity in comparison to a design that requires multiple belt tensioners. As described below, the bi-directional configuration and associated simplified power transfer belt arrangement 200 are enabled by the bi-directional nature of the gear set in the power transmission assembly 132. Additionally, a difference in the circumferences of the first and second pullies 210, 220 provides a change in the gear ratio between the power transmission assembly 132 and the electric machine 134. In one example, the power transfer belt arrangement 200 may provide a gear ratio of between 3:1-5:1, particularly a 4:1 ratio.

Figure 4A:
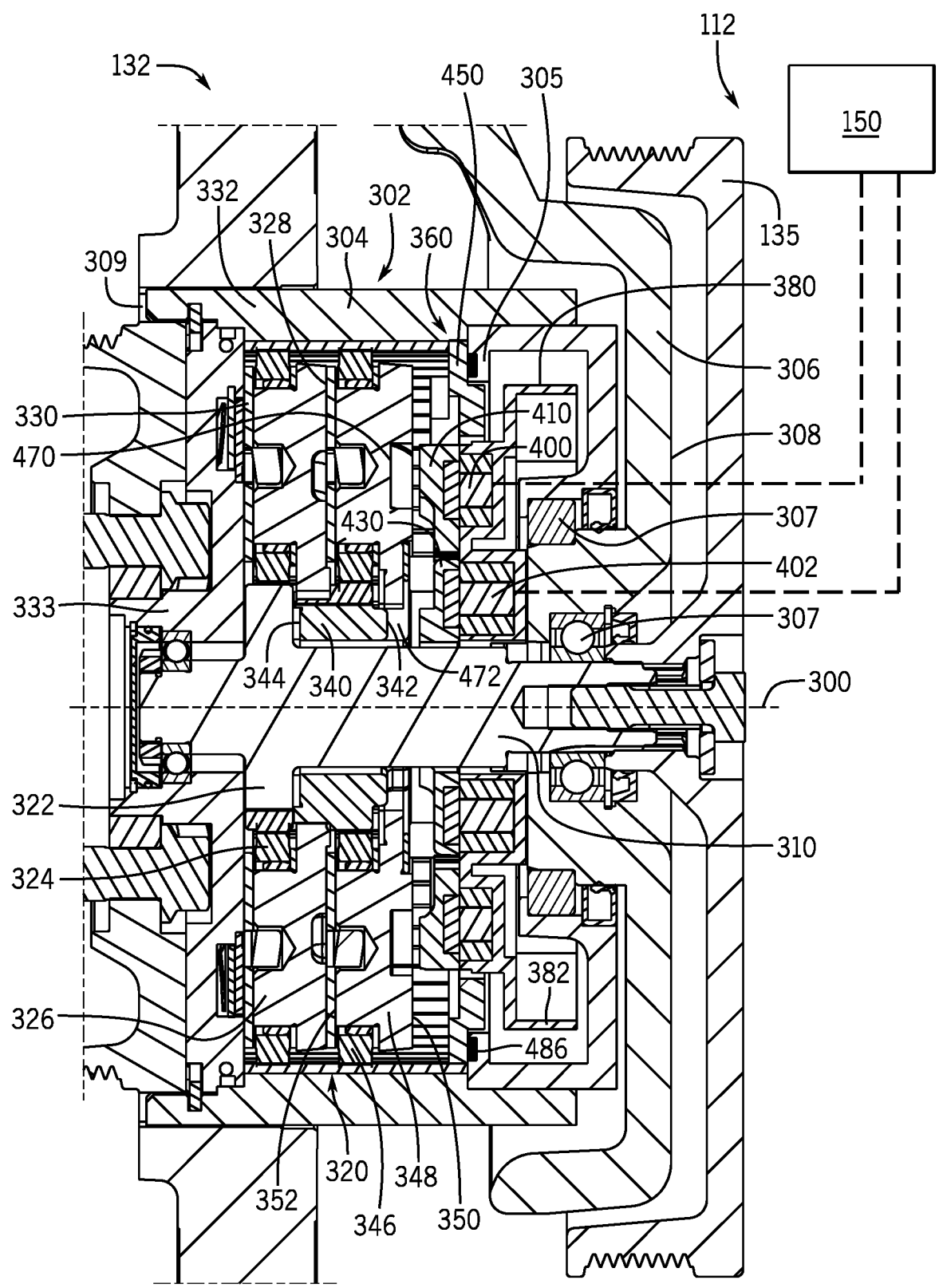
FIG. 4A is a first cross-sectional view of a power transmission assembly of the example starter-generator device that may be implemented in the work vehicle of FIG. 1.
Figure 4B:
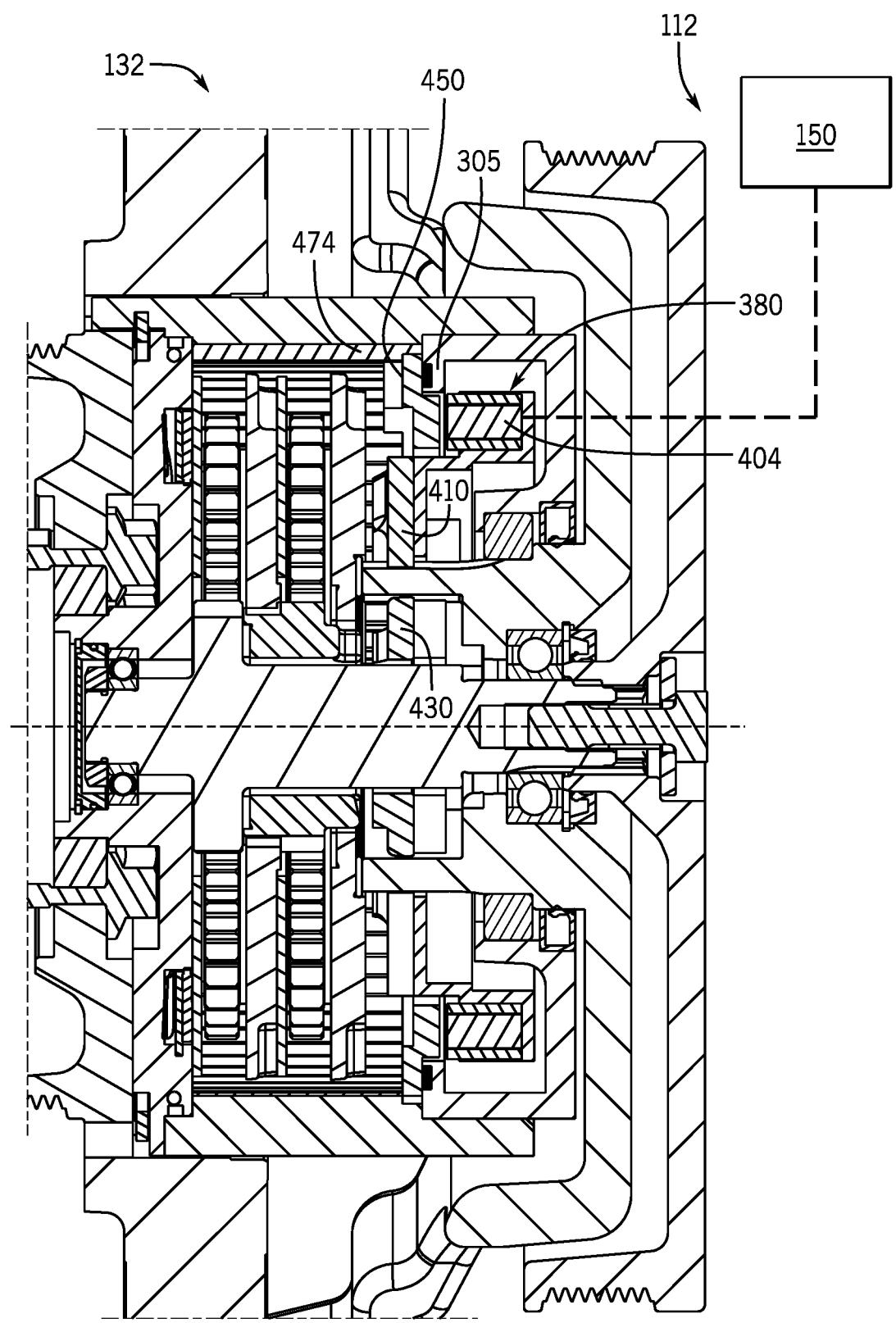
FIG. 4B is a second cross-sectional view, approximately 45° from the view of FIG. 4A, of a power transmission assembly of the example starter-generator device that may be implemented in the work vehicle of FIG. 1.

In one example, FIGS. 4A and 4B depict cross-sectional views of the power transmission assembly 132 that may be implemented into the starter-generator device 130. In this example, FIG. 4B is a cross-sectional view that is clocked approximately 45° relative to the cross-sectional view of FIG. 4A in order to depict different portions of the starter-generator device 130.

Referring initially to FIG. 4A, the power transmission assembly 132 includes a housing 302 with a rotatable housing portion 304 that, in this example, functions as a power transfer element of the assembly 132 and engages a corresponding power transfer element (e.g., crank shaft 122) of the engine 120. The housing 302 further includes a stationary housing portion 306 that supports the housing 302, particularly the rotatable housing portion 304, on the engine 120. Although not shown, the stationary housing portion 306 may include one or more (e.g., three) support legs with first ends that extend from the side of the housing 302 opposite the engine 120 and second ends that mount to the engine 120 (not shown in FIGS. 4A and 4B).

As shown, the power transmission assembly 132 may be considered to be a unit with the annular housing 302 configured to house various components of the power transmission assembly 132. In the view of FIG. 4A (and the view of FIG. 4B), a first side 308 of the power transmission assembly 132 is oriented towards the electric machine 134, and a second side 309 of the power transmission assembly 132 is oriented towards the engine 120. In one example, the stationary housing portion 306 is positioned relative to the rotatable housing portion 304 on bearings 307 that enable the relative rotation during operation.

At the first side 308, the power transmission assembly 132 includes an input shaft 310 that is rotatably coupled to the electric machine 134. In some examples and as shown, the input shaft 310 may be directly connected to the power transfer element 135 described above with reference to FIGS. 1 and 2 with bolts or other mechanisms; and in further examples, the input shaft 310 may be coupled through intermediate components, such as a flange or boss. It should be noted that, although the shaft 310 is described as an "input" shaft, it may transfer power both into and out of the power transmission assembly 132, depending on the mode, as described below. The input shaft 310 generally extends through the power transmission assembly 132 to define a primary axis of rotation 300.

The power transmission assembly 132 generally includes a planetary gear set 320. As described below, the planetary gear set 320 is a two stage planetary gear set and generally enables the power transmission assembly 132 to interface with the electric machine 134 (e.g., via the power transfer belt arrangement 200) and the engine 120 (e.g., via direct coupling to the crank shaft 122 of the engine 120). In some embodiments, the input shaft 310 may be considered part of the planetary gear set 320. Although one example configuration of the planetary gear set 320 is described below, other embodiments may have different configurations.

The planetary gear set 320 includes a first-stage sun gear 322 mounted for rotation on the input shaft 310. The first-stage sun gear 322 includes a plurality of teeth or splines that mesh with a set of first-stage planet gears 324 that circumscribe the first-stage sun gear 322. In one example, the first-stage planet gears 324 include a single circumferential row of one or more planet gears, although other embodiments may include radially stacked rows, each with an odd number of planet gears in the radial direction.

The first-stage planet gears 324 are supported by a first-stage planet carrier 326, which circumscribes the first-stage sun gear 322, as well as the input shaft 310, and is at least partially formed by first and second radially extending, axially facing carrier plates 328, 330. The first-stage carrier plates 328, 330 include a row of mounting locations for receiving axles extending through and supporting the first-stage planet gears 324 for rotation. As such, in this arrangement, each of the planet axles respectively forms an individual axis of rotation for each of the first-stage planet gears 324, and the first-stage planet carrier 326 enables the set of first-stage planet gears 324 to collectively rotate about the first-stage sun gear 322.

The gear set 320 further includes a ring gear 332 that circumscribes the first-stage sun gear 322 and the first-stage planet gears 324. The ring gear 332 includes radially interior teeth that engage the teeth of the first-stage planet gears 324. As such, first-stage planet gears 324 extend between, and engage with, the first-stage sun gear 322 and the ring gear 332. In some embodiments, a ring gear cover 333 may be mounted within the interior of the ring gear 332. The ring gear cover 333 functions to at least partially enclose the gear set 320 within the housing 302.

As shown, the ring gear 332 is fixedly arranged within the interior of the rotatable housing portion 304, which as noted above is positioned on bearings 307 to rotate relative to the stationary housing portion 306. With respect to the planetary gear set 320, the rotatable housing portion 304 and/or ring gear 332 may function as the power transfer element 133 relative to the engine 120. In this example, the rotatable housing portion 304 includes a number of castellations (not shown) that extend axially about the circumference of the axial face that faces the engine 120. The castellations engage and rotatably fix the ring gear 332 to the crank shaft 122 of the engine 120. The ring gear 332 and/or rotatable housing portion 304 may be considered output and/or input elements of the power transmission assembly 132 to receive rotational input in both power flow directions.

The gear set 320 further includes a second-stage sun gear 340 that is generally hollow and cylindrical, extending between first and second ends 342, 344, and circumscribing the input shaft 310. The first-stage planet carrier 326 has a splined engagement with, or is otherwise fixed to, the second-stage sun gear 340 proximate to the second end 344. Additionally, the second-stage sun gear 340 may include a series of splines that mesh with a set of second-stage planet gears 346. The second-stage planet gears 346 are supported by a second-stage planet carrier 348 formed by first and second planet carrier plates 350, 352. The second-stage planet gears 346 are positioned to additionally engage with the ring gear 332. The second-stage planet gears 346 each have an axle that extends between the two carrier plates 350, 352 that enable each planet gear 346 to rotate relative to the planet carrier 348 about the respective axle. As such, the second-stage planet gears 346 are positioned in between, and engage with each of, the second-stage sun gear 340 and the ring gear 332. Each second-stage planet gear 346 has the same or a different number of teeth relative to a corresponding first-stage planet gear 324.

As will now be described in greater detail, the power transmission assembly 132 additionally includes a clutch arrangement 360 configured to selectively engage and disengage various components of the planetary gear set 320 to modify the power flow through the power transmission assembly 132, e.g., according to the modes introduced above.

Generally, the clutch arrangement 360 includes an actuator (or cam) assembly 380, a first (or low) clutch 410, a second (or mid) clutch 430, and a third (or high) clutch 450. As described below, each clutch 410, 430, 450 may be selectively shifted between an engaged position and a disengaged position by the actuator assembly 380. As such, the clutches 410, 430, 450 may be considered "shifting" clutches that are actively actuated to modify power flow within the power transmission assembly 132.

As schematically shown in a combination of FIGS. 4A and 4B, the gear set 320 includes a number of engagement elements 470, 472, 474 that enable interaction between various components of the gear set 320 and the clutches 410, 430, 450. Generally, the engagement elements 470, 472, 474 are configured as slots, locks, or pockets that interact with the clutches 410, 430, 450, as described below. In some examples, one or more of the engagement elements 470, 472, 474 may be bi-directional with two angled walls or two perpendicular walls; or one or more of the engagement elements 470, 472, 474 may be designed having a single orientation, e.g., having an angled wall opposing a perpendicular wall.

As best shown in FIG. 4A, the first engagement elements 470 may be in the form of one or more slots or locks on the second-stage planet carrier 348. The first engagement elements 470 operate to receive a portion of the low clutch 410, as discussed below, to lock the second-stage planet carrier 348 to a stationary housing portion 306, i.e., to ground the second-stage planet carrier 348 and prevent rotation.

As best shown in FIG. 4A, the second engagement elements 472 may be in the form of one or more slots or locks on the second-stage sun gear 340 and/or the first-stage planet carrier 326. The second engagement elements 472 operate to receive a portion of the mid clutch 430, as discussed below, to lock the second-stage sun gear 340 and the first-stage planet carrier 326 to the stationary housing portion 306, i.e., to ground the second-stage sun gear 340 and prevent rotation.

As best shown in FIG. 4B, the third engagement elements 474 are configured to selectively couple and decouple the second-stage planet carrier 348 to the ring gear 332. In one example, the third engagement elements 474 include one or more shifting or sliding elements that are repositionable between a first position that enables independent rotation of the second-stage planet carrier 348 relative to the ring gear 332 (and the rotatable housing portion 304), and a second position that connects the second-stage planet carrier 348 for mutual rotation with the ring gear 332 (and rotatable housing portion 304). As discussed in greater detail below, actuation of the high clutch 450 into the engaged position shifts the third engagement elements 474 into the second position such that the second-stage planet carrier 348 is locked to the ring gear 332. In one example, as the high clutch 450 is returned to the disengaged position, the third engagement elements 474 may be returned to the first position (e.g., with a spring) such that the second-stage planet carrier 348 is decoupled from the ring gear 332 and rotatable housing portion 304. Other arrangement and mechanisms may be provided. In the views of FIGS. 4A and 4B, the clutches 410, 430, 450 are all in the disengaged positions.

Any suitable mechanism for engaging and disengaging the clutches 410, 430, 450 may be provided. In one example, the clutches 410, 430, 450 may be actively engaged or disengaged based on commands from the controller 150 (schematically shown in FIGS. 4A and 4B). The controller 150 may be considered part of the power transmission assembly 132 and/or the power transmission assembly 132 and the controller 150 may be considered a power control system 112 that functions to implement the appropriate power flow path between the engine 120 and the electric machine 134. Additional details regarding actuation of the clutches 410, 430, 450 are provided below.

Figure 6:
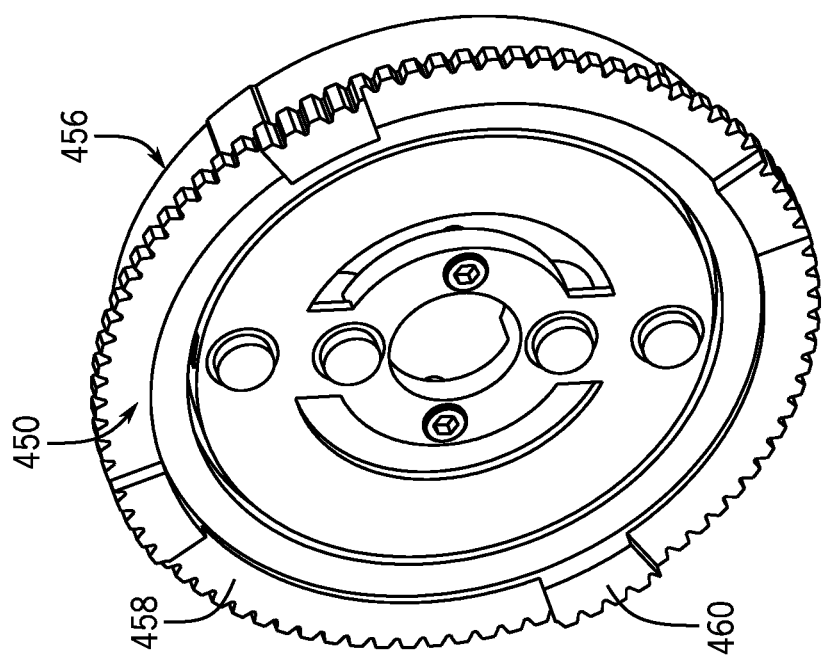
FIG. 6 is another isometric view of portions of the clutch arrangement of FIG. 5 for the example starter-generator device.
Figure 5:
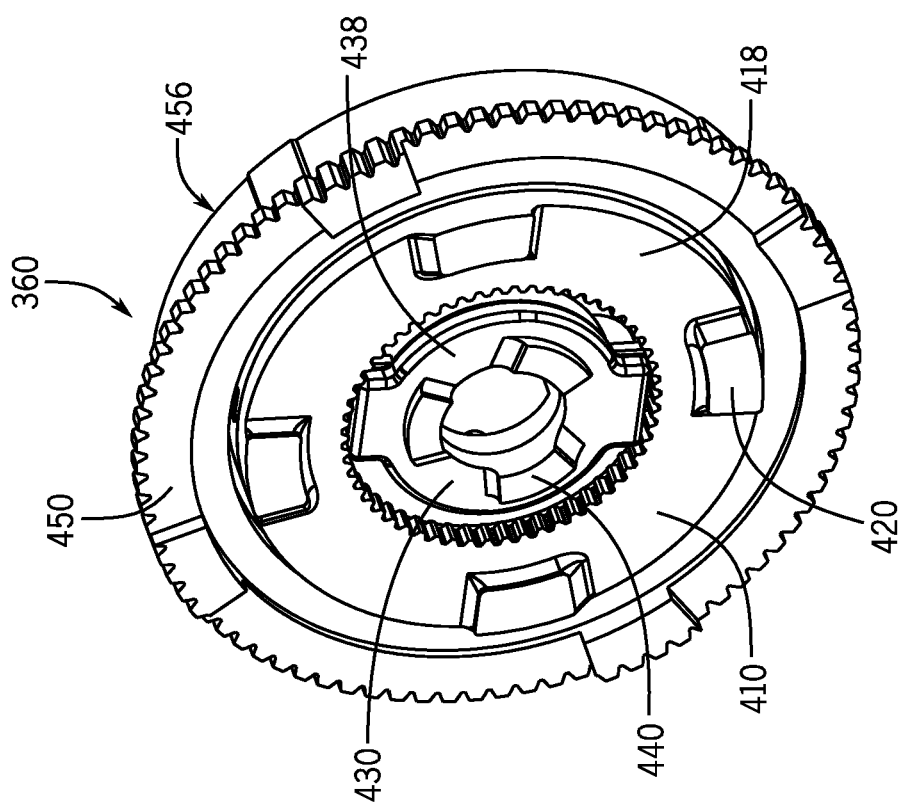
FIG. 5 is an isometric view of a clutch arrangement that may be incorporated into the power transmission assembly of FIGS. 4A and 4B for the example starter-generator device.
Figure 8:
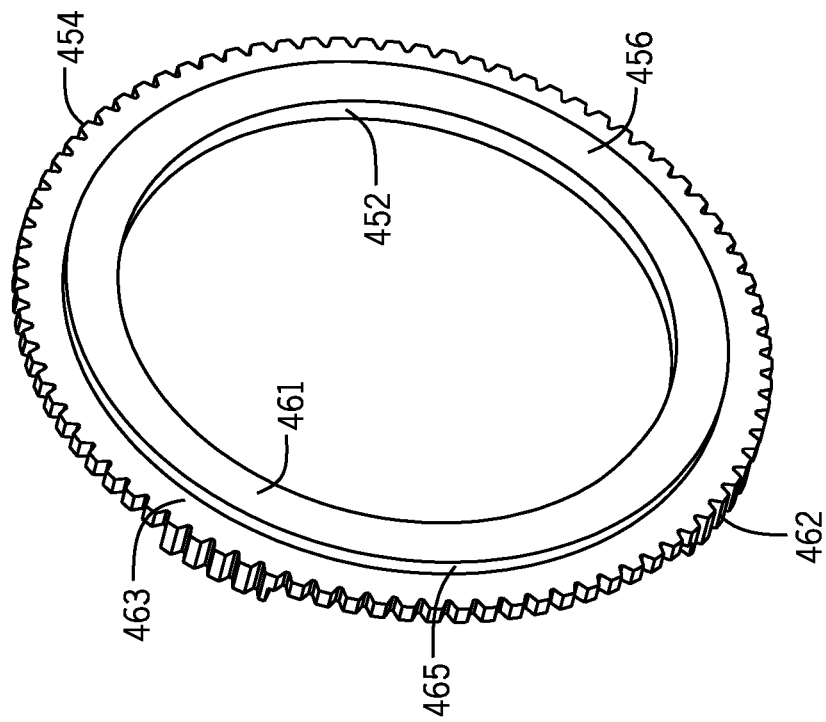
FIG. 8 is a first side isometric view of a high clutch of the clutch arrangement of FIG. 5 for the example starter-generator device.
Figure 7:
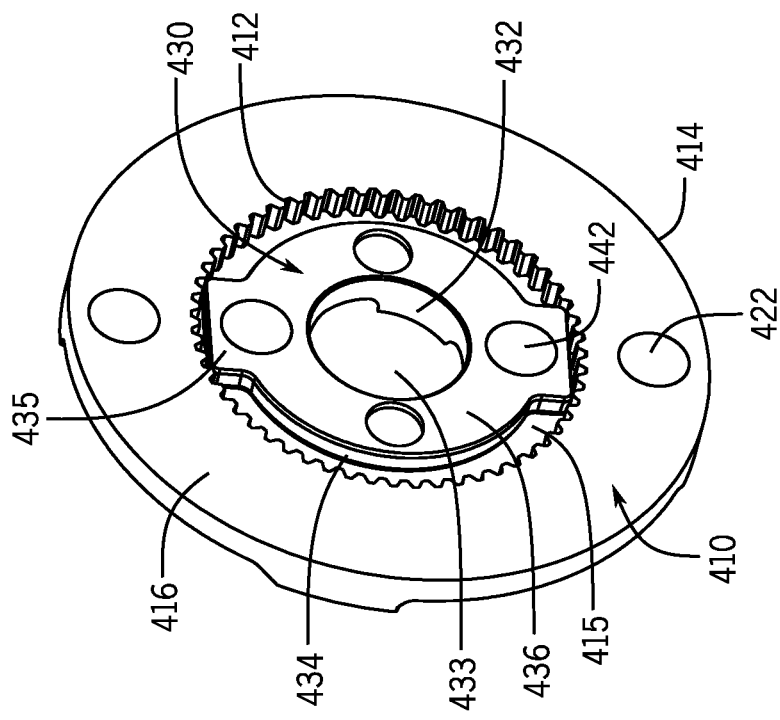
FIG. 7 is another isometric view of portions of the clutch arrangement of FIG. 5 for the example starter-generator device.
Figure 9B:
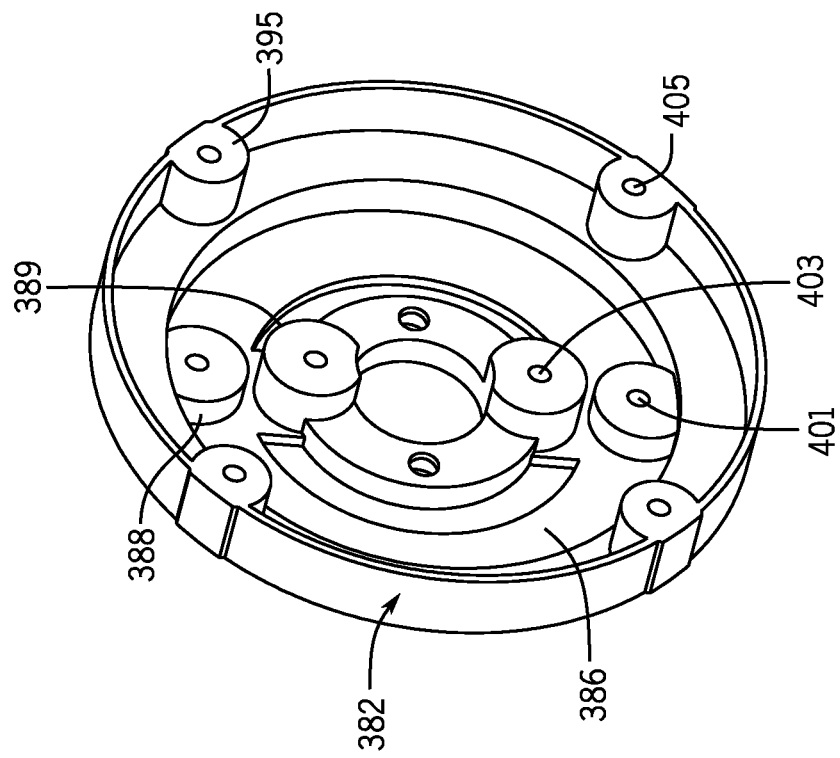
FIG. 9B is a second side isometric view of the actuator assembly cam plate of FIG. 9A for the clutch arrangement of the example starter-generator device.
Figure 9A:
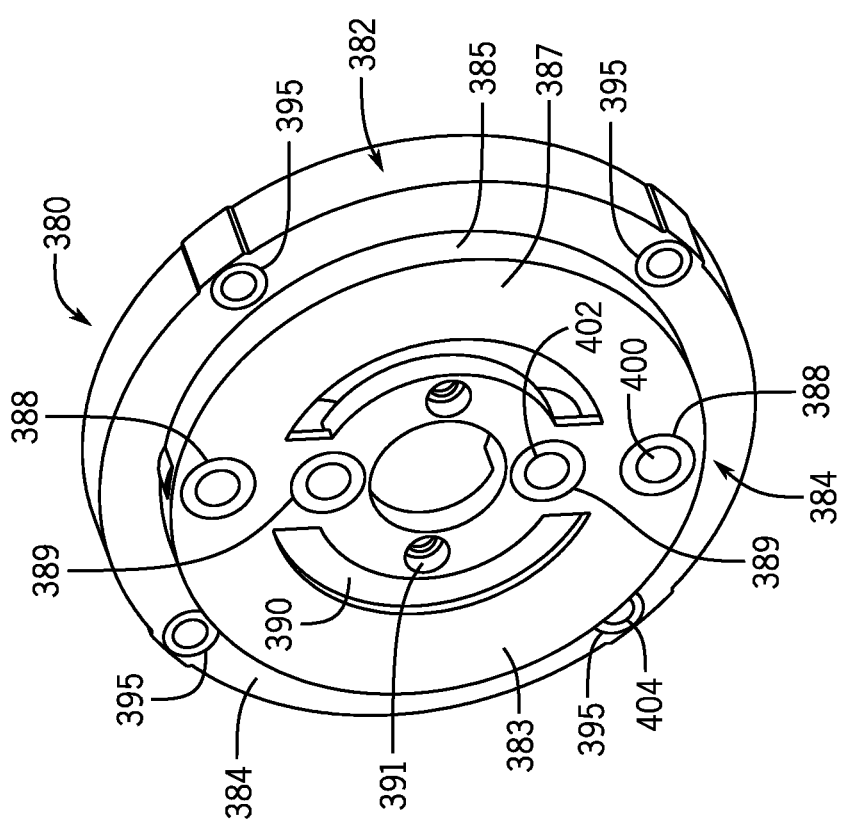
FIG. 9A is a first side isometric view of an actuator assembly cam plate of the clutch arrangement of FIG. 5 for the example starter-generator device.

Reference is now made to FIGS. 5-8, 9A, and 9B, which are isometric views of various aspects of the clutch arrangement 360 removed from the power transmission assembly 132. In particular, FIG. 5 is an engine-side isometric view of the clutch arrangement 360, particularly depicting the low clutch 410, mid clutch 430, and high clutch 450, and the actuator assembly 380; FIG. 6 is an engine-side isometric view of the high clutch 450 and the actuator assembly 380; FIG. 7 is an electric machine-side isometric view of the mid clutch 430 and low clutch 410; FIG. 8 is an electric machine-side isometric view of the high clutch 450; and FIGS. 9A and 9B are isometric views of a cam plate 382 of the actuator assembly 380. Interaction and operation of clutch arrangement 360 will be described below in greater detail below after an introduction of each structural element.

As best shown in FIGS. 5 and 7, the low clutch 410 is generally a disc or ring-type structure defined by an inner circumferential surface 412, an outer circumferential surface 414, a first (or electric machine-side) face 416, and a second (or engine-side) face 418. The inner circumferential surface 412 includes a series of splines to define an opening 415 that functions to accommodate the input shaft 310, discussed above, and to mount the low clutch 410 on a spindle or flange of the stationary housing portion 306. As described below, the low clutch 410 is configured to move axially between the engaged and disengaged positions and to remain stationary in the circumferential (or pivoting) and radial orientations.

The low clutch 410 further includes one or more teeth 420 arranged on the second face 418. In one example, the low clutch 410 include four low clutch teeth 420 extending in an axial direction at designed circumferential and radial positions. As described in greater detail below, the low clutch teeth 420 are configured to interact with the engagement elements 470 on the second-stage planet carrier 348 in the engaged position. The low clutch teeth 420 may have tapered or angled side walls to facilitate engagement and disengagement with the engagement elements 470. In effect, the low clutch teeth 420 enable operation of the low clutch 410 as a "dog clutch."

The low clutch 410 further includes one or more permanent magnets 422 arranged on the first face 416. Generally, the permanent magnet 422 is an element formed from a material that is magnetized and creates a persistent magnetic field. In one example, the low clutch magnets 422 include two low clutch magnets 422 at designed circumferential and radial positions. As described in greater detail below, the low clutch magnets 422 interact with the actuator assembly 380 for repositioning the low clutch 410 between the engaged and disengaged positions. The low clutch magnets 422 may be any type of permanent magnet and may have any suitable arrangement. In one example, the mid clutch magnets 442 may be omitted, and in such examples, the mid clutch 430 is formed with a ferrous, ferromagnetic, or other material that interacts with magnetic fields generated from the actuator assembly 380.

As best shown in FIGS. 5 and 7, the mid clutch 430 is generally a disc or ring-type structure defined by an inner circumferential surface 432, an outer circumferential surface 434, a first (or electric machine side) face 436, and a second (or engine side) face 438. The inner circumferential surface 432 defines an aperture 433 that accommodates the input shaft 310, discussed above. One or more tabs 435 extend from the outer circumferential surface 434. Generally, the mid clutch 430 is positioned radially within the aperture 415 of the low clutch 410, and the tabs 435 provide elements for mounting the mid clutch 430 to the spindle of the stationary housing portion 306. As described below, the mid clutch 430 is configured to move axially between the engaged and disengaged positions and to remain stationary in the circumferential (or pivoting) and radial orientations.

The mid clutch 430 further includes one or more teeth 440 arranged on the second face 438. In one example, the mid clutch teeth 440 include three mid clutch teeth 440 extending in an axial direction at designed circumferential and radial positions. As described in greater detail below, the mid clutch teeth 440 are configured to interact with the engagement elements 472 on the second-stage sun gear 340 in the engaged position. The mid clutch teeth 440 may have tapered or angled side walls to facilitate engagement and disengagement with the engagement elements 472. In effect, the mid clutch teeth 440 enable operation of the mid clutch 430 as a "dog clutch."

The mid clutch 430 further includes one or more permanent magnets 442 arranged on the first face 436. In one example, the mid clutch magnets 442 include two mid clutch magnets 442 at designed circumferential and radial positions. In one example, the mid clutch magnets 442 are radially aligned with the low clutch magnets 422 in the disengaged positions, although the magnets 422, 442 may be misaligned in other examples. As described in greater detail below, the mid clutch magnets 442 interact with the actuator assembly 380 for repositioning the mid clutch 430 between the engaged and disengaged positions. The mid clutch magnets 442 may be any type of permanent magnet and may have any suitable arrangement.

As best shown in FIGS. 6 and 8, the high clutch 450 is generally formed by ring-type structure defined by an inner circumferential wall 452, an outer circumferential wall 454, a first (or electric machine side) face 456, and a second (or engine side) face 458. The high clutch 450 may also be considered to be formed by an inner ring portion 461 and an outer ring portion 463 in which the outer ring portion 463 is partially axially offset relative to the inner ring portion 461 at a step 465. The high clutch 450 includes a series of teeth 460 extending in an axial direction about the circumference of the second face 458. As noted above, the high clutch teeth 460 are configured to engage with the engagement elements 474 when the high clutch 450 is in the engaged position. The high clutch teeth 460 may have tapered or angled side walls to facilitate engagement and disengagement with the engagement elements 474. In effect, the high clutch teeth 460 enable operation of the high clutch 450 as a "dog clutch." In some examples, the high clutch 450 may further include a series of splines 462 that extend around the outer circumferential wall 454 that function to facilitate mounting and supporting of the high clutch 450 within the housing 302. In one embodiment, the high clutch 450 is configured to rotate with the gear set 320 in the engaged position (e.g., as part of or forming the engagement elements 474) and remaining stationary in the disengaged position. In other embodiments, the high clutch 450 remains stationary or free to rotate in both positions.

The high clutch 450 is annular and sized to accommodate at least portions of the low clutch 410, the mid clutch 430, and the actuator assembly 380. As described in greater detail below, the high clutch 450 may be formed with a ferrous, ferromagnetic, or other material that interacts with magnetic fields generated from the actuator assembly 380 to reposition the high clutch 450 between the engaged position and the disengaged position. In other examples, the high clutch 450 may include one or more permanent magnets (not shown) mounted on the first face 456.

As introduced above, the actuator assembly 380 functions to actuate the clutches 410, 430, 450 between the engaged and disengaged positions in order to modify the power flow within the gear set 320 according to the modes to define the various gear ratios and flow directions.

As best shown in FIGS. 9A and 9B, the cam plate 382 is generally a stepped, disc-shaped element and defined by a first (or inner portion) 383 and a second (or outer) portion 384 with a first (or electric machine side) face 386 and a second (or engine side) face 387. The inner portion 383 is slightly axially offset relative to the outer portion 384. In particular, the inner portion 383 defines an outer circumferential surface 385 that forms a step joining the inner and outer portions 383, 384. The inner portion 383 further defines a first set of cavities 388, a second set of cavities 389, a set of mounting arcs 390, and a set of mounting apertures 391. In one example, the inner portion 383 defines two of each of the cavities 388, 389, mounting arcs 390, and mounting apertures 391. The outer portion 384 defines an outer circumferential surface 392 and further defines a third set of cavities 395. In one example, the outer portion 384 of the cam plate 382 defines four cavities within the third set of cavities 395, although the number may vary.

The mounting arcs 390 function to accommodate the spindle (not shown) of the housing 302 to support the cam plate 382. Moreover, the mounting apertures 391 are configured to receive a bolt or other attachment mechanism to further secure and support the cam plate 382 within the housing 302.

The actuator assembly 380 may further include a number of electromagnets 400, 402, 404 mounted within the cam plate 382. The electromagnets 400, 402, 404 may be any type of electromagnetic arrangement. Generally, the electromagnets 400, 402, 404 are magnets in which the magnetic field is produced by an electric current, for example, when current is passed through a wire coiled about a core of ferromagnetic or ferrimagnetic material. As such, the magnetic field may be activated when electromagnets 400, 402, 404 are provided with electric current, and the magnetic field may be deactivated with the electric current is discontinued. The polarity or direction of magnetic flux generated by each electromagnet 400, 402, 404 may be a function of the direction of current through the respective coil based on commands from the controller 150. In other words, one or more of the electromagnets 400, 402, 404 may have an energized state commanded by the controller 150 based on the desired nature of the resulting magnetic field, including a first energized state in which the current is such that the resulting magnetic field has an opposite orientation (i.e., an attractive force) relative to a cooperating permanent magnet and a second energized state in which the current is such that the resulting magnetic field has the same or common orientation (i.e., a repulsive force) relative to the cooperating permanent magnet. In some situations, one or more of the electromagnets 400, 402, 404 may only have a single energized state, particularly when interacting with a cooperating ferromagnetic material rather than a permanent magnet such that the energized state results in a magnetic field that attracts the elements of ferromagnetic material. As such, the electromagnets 400, 402, 404 may be operated by the controller 150 to selectively attract or repel cooperating magnets with a particular orientation or polarity, and/or to attract or not interact with ferromagnetic elements, as discussed in greater detail below.

The clutches 410, 430, 450 are arranged relative to the actuator assembly 380 to facilitate actuation. In addition to FIGS. 9A and 9B, reference is made to FIGS. 4A, 4B, 5, and 6, which depict the clutches 410, 430, 450 mounted on or proximate to the cam plate 382. In particular, the low and mid clutches 410, 430 are arranged proximate to the inner portion 383 of the cam plate 382 at the second face 387, in between the cam plate 382 and the gear set 320, and such that the electromagnets 400, 402 are respectively radially aligned with the low and mid clutch magnets 422, 442. In the disengaged position, the high clutch 450 circumscribes the outer circumferential surface 385, proximate to the second face 387 of the outer portion 384. As best shown in FIGS. 4A and 4B, the high clutch 450 is arranged such that the first face 456 of the outer ring portion 463 is proximate to a radial flange 305 of the housing 302. As discussed in greater detail below, a spring 486 is positioned in between the radial flange 305 of the housing 302 and the outer ring portion 463 of the high clutch 450 to facilitate actuation.

The first set of electromagnets 400 are arranged within one or more of the first set of cavities 388. In one example, access openings 401 may be provided on the cam plate 382 to enable wired access such that the controller 150 to command current to the electromagnets 400. As described below, the first set of electromagnets 400 may be configured to interact with the first set of permanent magnets 422 on the low clutch 410 via attraction and repulsion to selectively move the low clutch 410 in an axial direction between the engaged and disengaged positions. As best shown in FIG. 4A, the first set of electromagnets 400 are axially aligned with the low clutch magnets 422.

The second set of electromagnets 402 are arranged within one or more of the second set of cavities 389. In one example, access openings 403 may be provided on the cam plate 382 to enable wired access such that the controller 150 to command current to the electromagnets 402. As described below, the second set of electromagnets 402 may be configured to interact with the second set of permanent magnets 442 on the mid clutch 430 via attraction and repulsion to selectively move the mid clutch 430 in an axial direction between the engaged and disengaged positions. As best shown in FIG. 4B, the second set of electromagnets 402 are axially aligned with the mid clutch magnets 442.

The third set of electromagnets 404 are arranged within one or more of the third set of cavities 395. In one example, access openings 405 may be provided on the cam plate 382 to enable wired access such that the controller 150 to command current to the electromagnets 404. As described below, the third set of electromagnets 404 may be configured to interact with the high clutch 450 to selectively move the mid clutch 430 in an axial direction between the engaged and disengaged positions. As best shown in FIG. 4B, the third set of electromagnets 404 are axially oriented in the direction of the high clutch 450.

During operation, the actuator assembly 380 functions to reposition the clutches 410, 430, 450 relative to the planetary gear set 320 in order to cycle the power transmission assembly 132 through the gear ratios of the cold engine start mode, warm engine start mode, boost mode, and generation mode. As noted above, in one example, the actuator assembly 380 operates based on commands from the controller 150. In particular, the controller 150 functions to control the current applied to the sets of electromagnets 400, 402, 404 mounted on the cam plate 382. As introduced above, the controller 150 may command the "direction" of the current in order to selectively modify the nature or direction of the resulting magnetic field as one or more energized states, thereby enabling one or more of the electromagnets 400, 402, 404 to selectively attract or repel are cooperating permanent magnet (e.g., magnets 422, 442) with a particular orientation. In one example, TABLE 1, provided below, summarizes the state of each of the electromagnets 400, 402, 404 based on the controller commands during each of the modes.

TABLE 1

| Mode | Electromagnets | Energized State |
| --- | --- | --- |
| Cold Engine Start Mode | First Set Electromagnets for Low Clutch | Second - Common Field |
| | Second Set Electromagnets for Mid Clutch | First - Opposite Field |
| | Third Set Electromagnets for High Clutch | ON |
| Warm Engine Start Mode | First Set Electromagnets for Low Clutch | First - Opposite Field |
| | Second Set Electromagnets for Mid Clutch | Second - Common Field |
| | Third Set Electromagnets for High Clutch | ON |
| Boost Engine Mode | First Set Electromagnets for Low Clutch | First - Opposite Field |
| | Second Set Electromagnets for Mid Clutch | First - Opposite Field |
| | Third Set Electromagnets for High Clutch | OFF |
| Generation Mode | First Set Electromagnets for Low Clutch | First - Opposite Field |
| | Second Set Electromagnets for Mid Clutch | First - Opposite Field |
| | Third Set Electromagnets for High Clutch | OFF |

Figure 10:
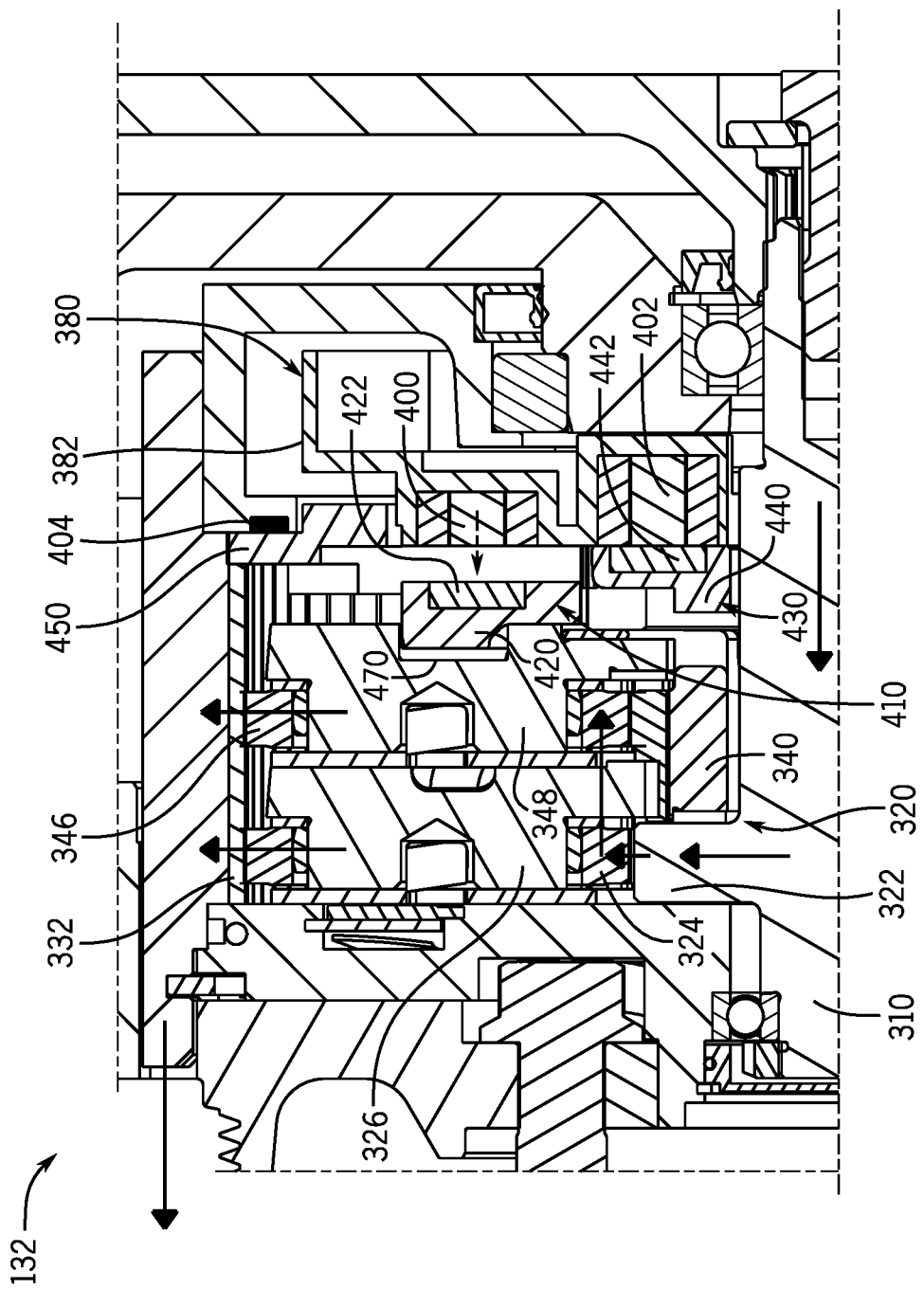
FIG. 10 is a partial cross-sectional view of the power transmission assembly of FIG. 4A for the example starter-generator device during a cold engine start mode.

Each mode will be discussed in greater detail below with additional reference to FIGS. 10-13. Reference is initially made to FIG. 10, which is a partial cross-sectional view of the power transmission assembly 132 in the cold engine start mode annotated with power flow arrows. As noted in TABLE 1, in the cold engine start mode, the first set of electromagnets 400 are energized in the second energized state, thereby resulting in the same direction of magnetic field orientation or polarity as the low clutch magnets 422; the second set of electromagnets 402 are energized in the first energized state, thereby resulting in the opposite direction of magnetic field orientation or polarity as the mid clutch magnets 442; and the third set of electromagnets 404 are energized in either energized state (e.g., with either direction of magnetic field orientation or polarity). As a result of this configuration, and as depicted in FIG. 10 relative to FIG. 4A, the low clutch 410 has been shifted axially away from the cam plate 382 into the engaged position as the low clutch magnets 422 are repelled by the first set of electromagnets 400; the mid clutch 430 is maintained axially relative to the cam plate 382 in the disengaged position as the mid clutch magnets 442 are attracted by the second set of electromagnets 402; and the high clutch 450 is maintained axially relatively to the cam plate 382 in the disengaged positions as the energized third set of electromagnets 404 attract the high clutch 450, thereby overcoming the spring force of spring 486.

As such, with the low clutch 410 in the engaged position, the low clutch 410 engages the engagement elements 470 to ground the second-stage planet carrier 348. With the mid clutch 430 in the disengaged position, the first-stage planet carrier 326 is free to rotate relative to the stationary housing portion 306; and with the high clutch 450 is in the disengaged position the first-stage planet carrier 326 is free to rotate relatively to the ring gear 332. As will now be described, this configuration enables operation in the cold engine start mode.

In the cold engine start mode, the engine 120 may be initially inactive, and activation of the ignition by an operator in the cabin 108 of the work vehicle 100 energizes the electric machine 134 to operate as a motor. In particular and additionally referring to FIG. 3, the electric machine 134 rotates the pulley 220 in the first clock direction D1, thereby driving the belt 230 and pulley 210 in the first clock direction D1. The pulley 210 drives the element 135, and thus the input shaft 310, in the first clock direction D1. Rotation of the input shaft 310 drives rotation of the first-stage sun gear 322, and in turn, rotation of the first-stage sun gear 322 drives rotation of the first-stage planet gears 324. The first-stage planet gears 324 drive the first-stage planet carrier 326, which as noted above is splined with the second-stage sun gear 340. As a result, the first-stage planet carrier 326 drives the second-stage sun gear 340 and thus the second-stage planet gears 346. As noted above, the second-stage planet carrier 348 is grounded by the low clutch 410. As such, rotation of the second-stage planet gears 346 operates to drive the ring gear 332. Since the number of second-stage planet gears 346 in the power flow path is an odd number (e.g., 1) in the radial direction, the second-stage planet gears 346 drive the ring gear 332 in the opposite direction (e.g., the second clock direction D2) relative to the second-stage sun gear 340 rotating in the first clock direction D1. As noted above, the ring gear 332 functions as part of the power transfer element 133 to interface with the crank shaft 122 of the engine 120 to drive and facilitate engine start. In effect, during the cold engine start mode, the power transmission assembly 132 operates as a sun-in, ring-out configuration.

In one example, the power transmission assembly 132 provides a 15:1 gear ratio in the power flow direction of the cold engine start mode. In other embodiments, other gear ratios (e.g., 10:1-30:1) may be provided. Considering a 4:1 gear ratio from the power transfer belt arrangement 200, a resulting 60:1 gear ratio (e.g., approximately 40:1 to about 120:1) may be achieved for the starter-generator device 130 between the electric machine 134 and the engine 120 during the cold engine start mode. As such, if for example the electric machine 134 is rotating at 10,000 RPM, the crank shaft 122 of the engine 120 rotates at about 100-150 RPM. In one example, the power transmission assembly 132 may deliver a torque of approximately 3000 Nm to the engine 120. Accordingly, the electric machine 134 may thus have normal operating speeds with relatively lower speed and higher torque output for cold engine start up.

Figure 11:
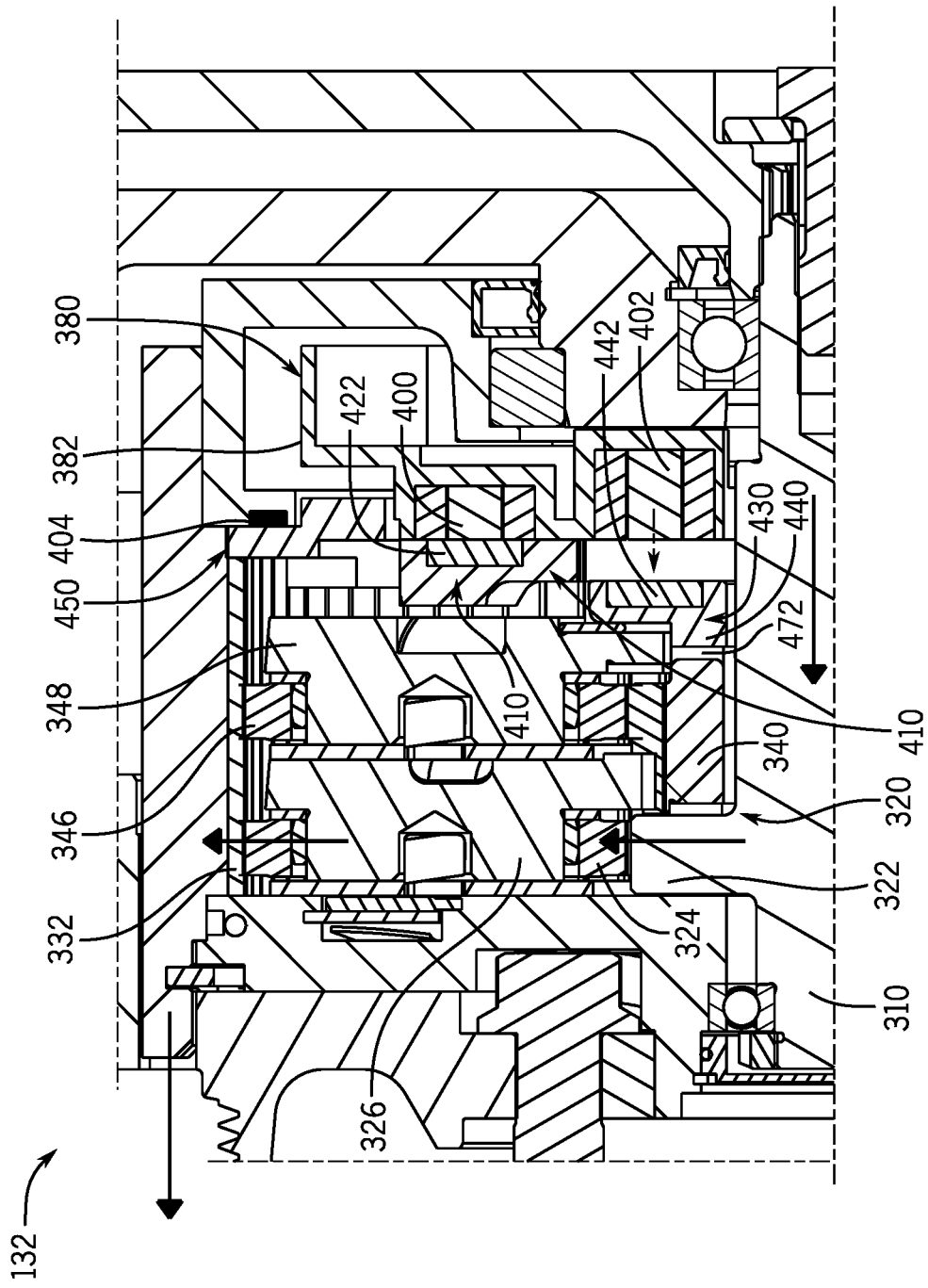
FIG. 11 is a partial cross-sectional view of the power transmission assembly of FIG. 4A for the example starter-generator device during a warm engine start mode.

Reference is now made to FIG. 11, which is a partial cross-sectional view of the power transmission assembly 132 in the warm engine start mode annotated with power flow arrows. As noted in TABLE 1, in the warm engine start mode, the first set of electromagnets 400 are energized in the first energized state, thereby resulting in the opposite direction of magnetic field orientation or polarity as the low clutch magnets 422; the second set of electromagnets 402 are energized in the second energized state, thereby resulting in the same direction of magnetic field orientation or polarity as the mid clutch magnets 442; and the third set of electromagnets 404 are energized in either energized state (e.g., with either direction of magnetic field orientation or polarity). As a result of this configuration, and as depicted in FIG. 11 relative to FIG. 4A, the low clutch 410 is maintained axially relative to the cam plate 382 in the disengaged position as the mid clutch magnets 442 are attracted by the second set of electromagnets 402; the mid clutch 430 has been shifted axially away from the cam plate 382 into the engaged position as the mid clutch magnets 442 are repelled by the second set of electromagnets 402; and the high clutch 450 is maintained axially relatively to the cam plate 382 in the disengaged positions as the energized third set of electromagnets 404 attract the high clutch 450, thereby overcoming the spring force of spring 486.

As such, with the mid clutch 430 in the engaged position, the mid clutch 430 engages the engagement elements 472 to ground the second-stage sun gear 340. With the low clutch 410 in the disengaged position, the second-stage planet carrier 348 is free to rotate relative to the stationary housing portion 306; and with the high clutch 450 is in the disengaged position, the first-stage planet carrier 326 is free to rotate relatively to the ring gear 332. As will now be described, this configuration enables operation in the warm engine start mode.

In the warm engine start mode, the engine 120 may be initially inactive or active. In any event, the controller 150 energizes the electric machine 134 to operate as a motor. In particular and additionally referring to FIG. 3, the electric machine 134 rotates the pulley 220 in the first clock direction D1, thereby driving the belt 230 and pulley 210 in the first clock direction D1. The pulley 210 drives the element 135, and thus the input shaft 310, in the first clock direction D1. Since the first-stage sun gear 322 is mounted on the input shaft 310, rotation of the input shaft 310 also rotates the first-stage sun gear 322. In turn, rotation of the first-stage sun gear 322 drives rotation of the first-stage planet gears 324. Since the first-stage planet carrier 326 and second-stage sun gear 340 are grounded, rotation of the first-stage planet gears 324 drives rotation of the ring gear 332. Since the number of first-stage planet gears 324 in the power flow path is an odd number (e.g., 1) in the radial direction, the first-stage planet gears 324 drive the ring gear 332 in the opposite direction (e.g., the second clock direction D2) relative to the input shaft 310 and the first-stage sun gear 322 rotating in the first clock direction D1. As noted above, the ring gear 332 functions as the power transfer element 133 to interface with the crank shaft 122 of the engine 120 to drive and facilitate engine start. In effect, during the warm engine start mode, the power transmission assembly 132 operates as a sun-in, ring-out configuration, albeit at a lower gear ratio as compared to the cold engine start mode.

In one example, the power transmission assembly 132 provides a 4:1 gear ratio in the power flow direction of the warm engine start mode. In other embodiments, other gear ratios (e.g., 3:1-7:1) may be provided. Considering a 4:1 gear ratio from the power transfer belt arrangement 200, a resulting 16:1 gear ratio (e.g., approximately 12:1 to about 28:1) may be achieved for the starter-generator device 130 between the electric machine 134 and the engine 120 during the warm engine start mode. As such, if for example the electric machine 134 is rotating at 10,000 RPM, the crank shaft 122 of the engine 120 rotates at about 600-700 RPM. In one example, the torque output of the power transmission assembly 132 for the engine 120 is approximately 400-600 Nm. Accordingly, the electric machine 134 may thus have normal operating speeds with a relatively lower speed and higher torque output for engine start up.

Figure 12:
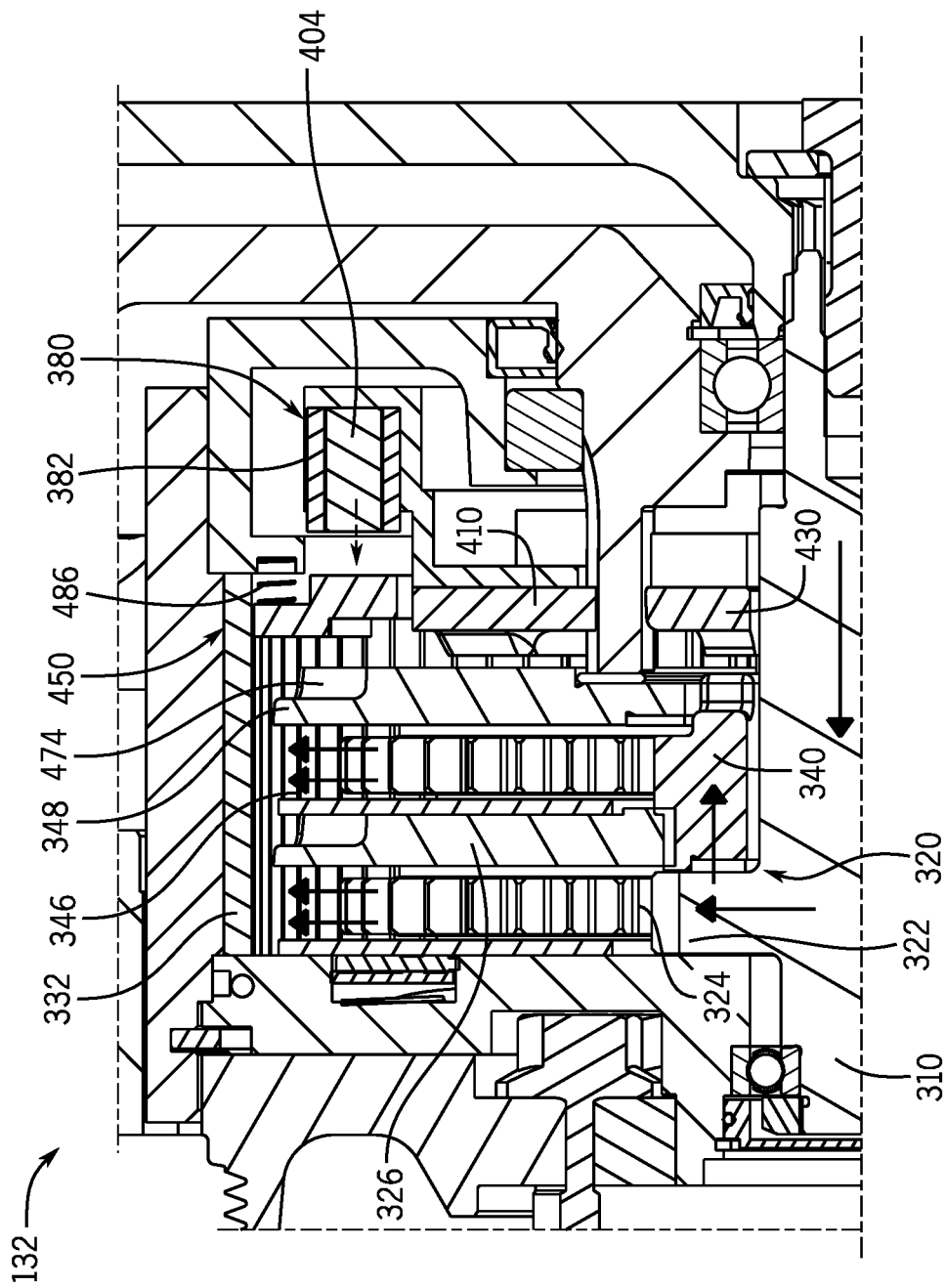
FIG. 12 is a partial cross-sectional view of the power transmission assembly of FIG. 4B for the example starter-generator device during an engine boost mode.

Reference is now made to FIG. 12, which is a partial cross-sectional view of the power transmission assembly 132 in the boost mode annotated with power flow arrows. As noted in TABLE 1, in the boost mode, the first set of electromagnets 400 are energized in the first energized state, thereby resulting in the opposite direction of magnetic field orientation or polarity as the low clutch magnets 422; the second set of electromagnets 402 are energized in the first energized state, thereby resulting in the opposite direction of magnetic field orientation or polarity as the mid clutch magnets 442; and the third set of electromagnets 404 are deenergized (e.g., with no power). As a result of this configuration, and as depicted in FIG. 12 relative to FIG. 4B, the low clutch 410 is maintained axially relative to the cam plate 382 in the disengaged position as the low clutch magnets 422 are attracted by the first set of electromagnets 400; the mid clutch 430 is maintained axially relative to the cam plate 382 in the disengaged position as the mid clutch magnets 442 are attracted by the second set of electromagnets 402; and the high clutch 450 is no longer maintained in the disengaged position because the high clutch 450 is no longer attracted by the third set of electromagnets 404. Since the high clutch 450 is no long subject to the magnetic attraction of the third set of electromagnets, the spring force of spring 486 pushes the high clutch 450 into the engaged position.

As such, with the high clutch 450 in the engaged position, the high clutch 450 engages the engagement elements 474 to connect the second-stage planet carrier 348 and the ring gear 332. With the low clutch 410 in the disengaged position, the second-stage planet carrier 348 is free to rotate relative to the stationary housing portion 306; and with the mid clutch 430 in the disengaged position, the first-stage planet carrier 326 is free to rotate relative to the stationary housing portion 306. As will now be described, this configuration enables operation in the boost mode.

In the boost mode, the engine 120 is active and the electric machine 134 operates as a motor. In particular and additionally referring to FIG. 3, the electric machine 134 rotates the pulley 220 in the first clock direction D1, thereby driving the belt 230 and pulley 210 in the first clock direction D1. The pulley 210 drives the element 135, and thus the input shaft 310, in the first clock direction D1. Rotation of the input shaft 310 drives rotation of the first-stage sun gear 322, and in turn, rotation of the first-stage sun gear 322 drives rotation of the first-stage planet gears 324.

As noted above, the second-stage planet carrier 348 is locked to the ring gear 332 by the high clutch 450. As a result, rotation of the input shaft 310 drives the ring gear 332 via the rotation of the first-stage sun gear 322, the first-stage planet gears 324, the first-stage planet carrier 326, the second-stage sun gear 340, and the second-stage planet gears 346 about the primary rotational axis 300. In effect, the gear set 320 rotates as a unit about the primary rotational axis 300. Since the other components of the planetary gear set 320 rotate with the input shaft 310, the ring gear 332 is driven in the same second clock direction D2. As noted above, the ring gear 332 functions as part of the power transfer element 133 to interface with the crank shaft 122 of the engine 120 to drive the engine 120. In effect, during the boost mode, the power transmission assembly 132 operates as a sun-in, ring-out configuration.

In one example, the power transmission assembly 132 provides a 1:1 gear ratio in the power flow direction of the boost mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the boost mode. As such, if for example the electric machine 134 is rotating at 10,000 RPM, the crank shaft 122 of the engine 120 rotates at about 2500 RPM. Accordingly, the electric machine 134 may thus have normal operating speeds while providing an appropriate boost speed to the engine 120.

Figure 13:
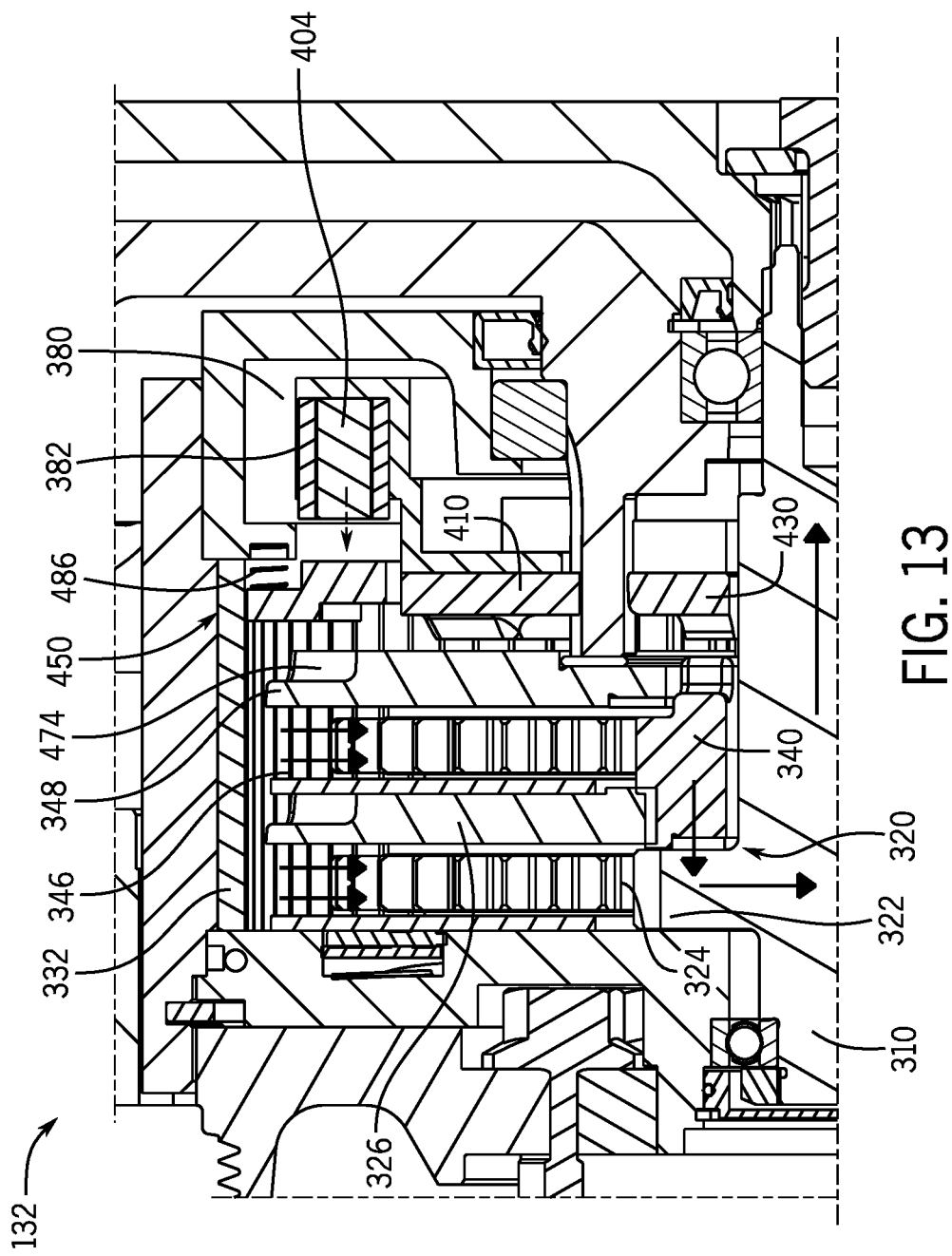
FIG. 13 is a partial cross-sectional view of the power transmission assembly of FIG. 4B for the example starter-generator device during a generation mode.

Reference is now made to FIG. 13, which is a cross-sectional view of the power transmission assembly 132 annotated with power flow arrows. The power flow arrows of FIG. 13 particularly depict operation of the power transmission assembly 132 in the generation mode. As noted in TABLE 1, the generation mode has the same electromagnet commands as the boost mode such that the low and mid clutches 410, 430 are in the disengaged positions and the high clutch 450 is in the engaged position. In this position, the first-stage planet carrier 326, as well as the second-stage planet carrier 348 and sun gears 322, 340, are locked for rotation with the ring gear 332 to enable operation of the power transmission assembly 132 in the generation mode. For the generation mode (and subsequent to the engine start modes and/or the boost mode), the engine 120 begins to accelerate above rotational speed provided by power transmission assembly 132, and the electric machine 134 is commanded to decelerate and to cease providing torque to power transmission assembly 132. After the engine 120 has stabilized to a sufficient speed and the electric machine 134 has sufficiently decelerated or stopped, the high clutch 450 is engaged as described above to operate the power transmission assembly 132 in the generation mode.

In the generation mode, the engine 120 rotates the crank shaft 122 and power transfer element 133 that is engaged with the ring gear 332, thus driving the ring gear 332 in the second clock direction D2. The ring gear 332 drives the first-stage planet gears 324 and the second-stage planet gears 346, which respectively drive the first-stage sun gear 322 and the second-stage sun gear 340, and further driving input shaft 310. Therefore, as the ring gear 332 rotates in the second clock direction D2, the input shaft 310 is driven and similarly rotates in the second clock direction D2 at the same rate of rotation. As noted above, the input shaft 310 is connected with and provides output power to the electric machine 134 in the second clock direction D2 via the power transfer belt arrangement 200. In effect, during the generation mode, the power transmission assembly 132 operates as a ring-in, sun-out configuration.

In one example, the power transmission assembly 132 provides a 1:1 gear ratio in the power flow direction of the generation mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the generation mode. As a result, the electric machine 134 may thus have normal operating speeds in both power flow directions with relatively low torque output during power generation.

Thus, various embodiments of the vehicle electric system have been described that include an integrated starter-generator device. Various transmission assemblies may be included in the device, thus reducing the space occupied by the system. The transmission assembly may provide multiple speeds or gear ratios and transition between speeds/gear ratios. One or more clutch arrangements may be used to selectively apply torque to the gear set of the transmission assembly in both power flow directions. Direct mechanical engagement with the engine shaft reduces the complexity and improves reliability of the system. Using planetary gear sets in the transmission assembly provides high gear reduction and torque capabilities with reduced backlash in a compact space envelope. As a result of the bi-directional nature of the power transmission assembly, the power transfer belt arrangement may be implemented with only a single belt tensioner, thereby providing a relatively compact and simple assembly. Additionally, by using the power transfer belt arrangement with belt and pullies to couple together and transfer power between the electric machine and the power transmission assembly, instead of directly connecting and coupling the electric machine to the power transmission assembly, the electric machine may be mounted apart from the transmission assembly to better fit the engine in a vehicle engine bay. Additionally, by using the belt and pullies to couple the electric machine to the power transmission assembly, an additional gear ratio (e.g., a 4:1 ratio) may be achieved. Embodiments discussed above include a double planetary gear set, sun in, ring out configuration to provide warm and cold engine start modes and a ring in, sun out configuration to provide a generation mode. As such, a four mode assembly may be provided.

Accordingly, the combination starter-generator may further include a clutch arrangement with first, second, and third clutches that are actuated with electromagnets mounted on a cam plate of a cam actuator assembly. In one example, one or more of the clutches may have permanent magnets that interact with corresponding electromagnets on the cam plate based on the nature of the current supplied to the electromagnets. In this manner, the clutches are repelled and attracted relative to the cam plate to axially shift between engaged and disengaged positions, thereby modifying the power flow within the power transmission assembly.

Also, the following examples are provided, which are numbered for easier reference.

1. A combination starter-generator device for a work vehicle having an engine, the starter-generator device comprising: an electric machine; a gear set configured to receive rotational input from the electric machine and from the engine and to couple the electric machine and the engine in a first power flow direction and a second power flow direction, the gear set configured to operate in one of at least a first gear ratio, a second gear ratio, or a third gear ratio in the first power flow direction and at least a fourth gear ratio in the second power flow direction; at least one clutch selectively coupled to the gear set to effect the first, second, and third gear ratios in the first power flow direction and the fourth gear ratio in the second power flow direction; and an actuator assembly including at least one electromagnet configured to selectively shift the at least one clutch from a disengaged position in which the at least one clutch is decoupled from the gear set into an engaged position in which the at least one clutch is coupled to the gear set.

2. The combination starter-generator device of example 1, wherein the actuator assembly includes a cam plate that is generally disc-shaped with a first cam plate face and a second cam plate face, opposite the first cam plate face and oriented towards the at least one clutch, the cam plate including the at least one electromagnet configured to selectively shift the at least one clutch between the disengaged position and the engaged position.

3. The combination starter-generator device of example 2, further comprising at least one permanent magnet mounted to the at least one clutch, and wherein the at least one electromagnet is configured to be selectively energized in a first energized state to generate an opposite orientation magnetic field relative to the at least one permanent magnet such that the at least one permanent magnet is attracted to the at least one electromagnet and a second energized state to generate a common orientation magnetic field relative to the at least one permanent magnet such that the at least one permanent magnet is repelled by the at least one electromagnet.

4. The combination starter-generator device of example 3, wherein the at least one clutch includes the first clutch and the second clutch, each selectively positionable between the engaged position and the disengaged position, and wherein the at least one electromagnet includes at least one first electromagnet configured to selectively reposition the first clutch between the engaged position and the disengaged position and at least one second electromagnet configured to selectively reposition the second clutch between the engaged position and the disengaged position.

5. The combination starter-generator device of example 4, wherein the at least one permanent magnet includes at least one first permanent magnet mounted on the first clutch and positioned proximate to, and cooperating with, the at least one first electromagnet of the cam plate, and at least one second permanent magnet mounted on the second clutch and positioned proximate to, and cooperating with, the at least one second electromagnet of the cam plate, wherein, when the at least one first electromagnet is energized in the first energized state relative to the at least one first permanent magnet, the first clutch is attracted relative to the cam plate and positioned in the disengaged position, and when the at least one first electromagnet is energized in the second energized state relative to the at least one first permanent magnet, the first clutch is repelled relative to the cam plate and positioned in the engaged position, and wherein, when the at least one second electromagnet is energized in the first energized state relative to the at least one second permanent magnet, the second clutch is attracted relative to the cam plate and positioned in the disengaged position, and when the at least one second electromagnet is energized in the second energized state relative to the at least one second permanent magnet, the second clutch is repelled relative to the cam plate and positioned in the engaged position.

6. The combination starter-generator device of example 5, wherein the first and second clutches are dog clutches and the second clutch is concentrically arranged within the first clutch when the first and the second clutches are in the disengaged positions.

7. The combination starter-generator device of example 6, wherein the at least one clutch further includes a third clutch selectively positionable between the engaged position and the disengaged position, the first and second clutches being concentrically arranged within the third clutch when the first and second clutches are in the disengaged positions.

8. The combination starter-generator device of example 7, further comprising a housing with a rotatable housing portion and a stationary housing portion, at least portions of the gear set, the first, second, and third clutches, and the actuator assembly being housed within the rotatable housing portion, wherein the at least one electromagnet further includes at least one third electromagnet positioned proximate to and cooperating with the third clutch, and wherein the at least one third electromagnet is configured to be energized to attract the third clutch such that the third clutch is positioned in the disengaged position.

9. The combination starter-generator device of example 8, wherein the actuator assembly further includes a spring positioned in between the third clutch and the housing, wherein, when the at least one third electromagnet is energized and the third clutch is in the disengaged position, the spring is compressed, and wherein the at least one third electromagnet is configured to be deenergized to release the third clutch such that the spring forces the third clutch towards the gear set into the engaged position.

10. The combination starter-generator device of example 9, wherein the first clutch includes at least one first clutch tooth, the second clutch includes at least one second clutch tooth, and the third clutch includes at least one third clutch tooth, and wherein, in the respective engaged positions of the first, second, and third clutches, the at least one first tooth, the at least one second tooth, and the at least one third tooth are engaged with the gear set.

11. The combination starter-generator device of example 10, wherein the gear set includes a compound epicyclic gear train including an input shaft, first-stage and second-stage sun gears, first-stage and second-stage planet gears, first-stage and second-stage carriers, and a ring gear with the first-stage planet carrier splined to the second-stage sun gear; wherein, in a cold engine start mode, the first clutch is in the engaged position to ground the second-stage planet carrier and the second and third clutches are in the disengaged positions, and further, rotational power from the electric machine moves in the first power flow direction from the input shaft, to the first-stage sun gear, to the first stage-planet gears, to the first-stage planet carrier, to the second-stage sun gear, to the second-stage planet gears, and to the ring gear out to the engine at the first gear ratio; and wherein, in a warm engine start mode, the second clutch is in the engaged position to ground the first-stage planet carrier and the first and third clutches are in the disengaged positions, and further, the rotational power from the electric machine moves in the first power flow direction from the input shaft, to the first-stage sun gear, to the first stage-planet gears, and to the ring gear out to the engine at the second gear ratio.

12. The combination starter-generator device of example 11, wherein, in a boost mode, the third clutch is in the engaged position to couple the first-stage planet carrier to the ring gear and the first and second clutches are in the disengaged positions, and further, the rotational power from the electric machine moves in the first power flow direction from the input shaft, to the first-stage and second-stage sun gears, to the first-stage and second-stage planet gears, and to the ring gear out to the engine at the third gear ratio; and wherein, in a generation mode, the third clutch is in the engaged position to couple the first-stage planet carrier to the ring gear and the first and second clutches are in the disengaged positions, and further, rotational power from the engine moves in the second power flow direction from the ring gear, to the first-stage and second-stage planet gears, to the first-stage and second-stage sun gears, and to the input shaft out to the electric machine at the fourth gear ratio.

13. The combination starter-generator device of example 12, wherein each of the third gear ratio and the fourth gear ratio is a 1:1 ratio through the gear set, and wherein the first gear ratio is greater than the second gear ratio, and the second gear ratio is greater than the third gear ratio.

14. A drivetrain assembly for a work vehicle, comprising: an engine; an electric machine; a gear set configured to receive rotational input from the electric machine and from the engine and to couple the electric machine and the engine in a first power flow direction and a second power flow direction, the gear set configured to operate in one of at least a first gear ratio, a second gear ratio, or a third gear ratio in the first power flow direction and at least the third gear ratio in the second power flow direction; at least one clutch selectively coupled to the gear set to effect the first, second, and third gear ratios in the first power flow direction and the fourth gear ratio in the second power flow direction; at least one permanent magnet mounted on the at least one clutch; an actuator assembly including a cam plate that is generally disc-shaped with a first cam plate face and a second cam plate face, opposite the first cam plate face and oriented towards the at least one clutch, the cam plate including the at least one electromagnet configured selectively shift the at least one clutch between a disengaged position in which the at least one clutch is decoupled from the gear set into an engaged position in which the at least one clutch is coupled to the gear set; and a controller coupled to the at least one electromagnet to selectively energize the at least one electromagnet in a first energized state to generate an opposite orientation magnetic field relative to the at least one permanent magnet such that the at least one permanent magnet is attracted to the at least one electromagnet and a second energized state to generate a common orientation magnetic field relative to the at least one permanent magnet such that the at least one permanent magnet is repelled by the at least one electromagnet.

15. The drivetrain assembly of example 14, wherein the at least one clutch includes the first clutch and the second clutch, each selectively positionable between the engaged position and the disengaged position, wherein the at least one electromagnet includes at least one first electromagnet configured to selectively reposition the first clutch between the engaged position and the disengaged position and at least one second electromagnet configured to selectively reposition the second clutch between the engaged position and the disengaged position, wherein the at least one permanent magnet includes at least one first permanent magnet mounted on the first clutch and positioned proximate to, and cooperating with, the at least one first electromagnet of the cam plate, and at least one second permanent magnet mounted on the second clutch and positioned proximate to, and cooperating with, the at least one second electromagnet of the cam plate, wherein, when the at least one first electromagnet is energized in the first energized state relative to the at least one first permanent magnet, the first clutch is attracted relative to the cam plate and positioned in the disengaged position, and when the at least one first electromagnet is energized in the second energized state relative to the at least one first permanent magnet, the first clutch is repelled relative to the cam plate and positioned in the engaged position, and wherein, when the at least one second electromagnet is energized in the first energized state relative to the at least one second permanent magnet, the second clutch is attracted relative to the cam plate and positioned in the disengaged position, and when the at least one second electromagnet is energized in the second energized state relative to the at least one second permanent magnet, the second clutch is repelled relative to the cam plate and positioned in the engaged position.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A combination starter-generator device for a work vehicle having an engine, the starter-generator device comprising:
   an electric machine;
   a gear set configured to receive rotational input from the electric machine and from the engine and to couple the electric machine and the engine in a first power flow direction and a second power flow direction, the gear set configured to operate in one of at least a first gear ratio, a second gear ratio, or a third gear ratio in the first power flow direction and at least a fourth gear ratio in the second power flow direction;

at least one clutch selectively coupled to the gear set to effect the first, second, and third gear ratios in the first power flow direction and the fourth gear ratio in the second power flow direction; and an actuator assembly including at least one electromagnet configured to selectively shift the at least one clutch from a disengaged position in which the at least one clutch is decoupled from the gear set into an engaged position in which the at least one clutch is coupled to the gear set.

2. The combination starter-generator device of claim 1, wherein the actuator assembly includes a cam plate that is generally disc-shaped with a first cam plate face and a second cam plate face, opposite the first cam plate face and oriented towards the at least one clutch, the cam plate including the at least one electromagnet configured to selectively shift the at least one clutch between the disengaged position and the engaged position.

3. The combination starter-generator device of claim 2, further comprising at least one permanent magnet mounted to the at least one clutch, and
wherein the at least one electromagnet is configured to be selectively energized in a first energized state to generate an opposite orientation magnetic field relative to the at least one permanent magnet such that the at least one permanent magnet is attracted to the at least one electromagnet and a second energized state to generate a common orientation magnetic field relative to the at least one permanent magnet such that the at least one permanent magnet is repelled by the at least one electromagnet.

4. The combination starter-generator device of claim 3,
wherein the at least one clutch includes the first clutch and the second clutch, each selectively positionable between the engaged position and the disengaged position, and
wherein the at least one electromagnet includes at least one first electromagnet configured to selectively reposition the first clutch between the engaged position and the disengaged position and at least one second electromagnet configured to selectively reposition the second clutch between the engaged position and the disengaged position.

5. The combination starter-generator device of claim 4,
wherein the at least one permanent magnet includes at least one first permanent magnet mounted on the first clutch and positioned proximate to, and cooperating with, the at least one first electromagnet of the cam plate, and at least one second permanent magnet mounted on the second clutch and positioned proximate to, and cooperating with, the at least one second electromagnet of the cam plate,
wherein, when the at least one first electromagnet is energized in the first energized state relative to the at least one first permanent magnet, the first clutch is attracted relative to the cam plate and positioned in the disengaged position, and when the at least one first electromagnet is energized in the second energized state relative to the at least one first permanent magnet, the first clutch is repelled relative to the cam plate and positioned in the engaged position, and
wherein, when the at least one second electromagnet is energized in the first energized state relative to the at least one second permanent magnet, the second clutch is attracted relative to the cam plate and positioned in the disengaged position, and when the at least one second electromagnet is energized in the second energized state relative to the at least one second permanent magnet, the second clutch is repelled relative to the cam plate and positioned in the engaged position.

6. The combination starter-generator device of claim 5,
wherein the first and second clutches are dog clutches and the second clutch is concentrically arranged within the first clutch when the first and the second clutches are in the disengaged positions.

7. The combination starter-generator device of claim 6,
wherein the at least one clutch further includes a third clutch selectively positionable between the engaged position and the disengaged position, the first and second clutches being concentrically arranged within the third clutch when the first and second clutches are in the disengaged positions.

8. The combination starter-generator device of claim 7, further comprising a housing with a rotatable housing portion and a stationary housing portion, at least portions of the gear set, the first, second, and third clutches, and the actuator assembly being housed within the rotatable housing portion,
wherein the at least one electromagnet further includes at least one third electromagnet positioned proximate to and cooperating with the third clutch, and
wherein the at least one third electromagnet is configured to be energized to attract the third clutch such that the third clutch is positioned in the disengaged position.

9. The combination starter-generator device of claim 8,
wherein the actuator assembly further includes a spring positioned in between the third clutch and the housing,
wherein, when the at least one third electromagnet is energized and the third clutch is in the disengaged position, the spring is compressed, and
wherein the at least one third electromagnet is configured to be deenergized to release the third clutch such that the spring forces the third clutch towards the gear set into the engaged position.

10. The combination starter-generator device of claim 9,
wherein the first clutch includes at least one first clutch tooth, the second clutch includes at least one second clutch tooth, and the third clutch includes at least one third clutch tooth, and
wherein, in the respective engaged positions of the first, second, and third clutches, the at least one first tooth, the at least one second tooth, and the at least one third tooth are engaged with the gear set.

11. The combination starter-generator device of claim 10,
wherein the gear set includes a compound epicyclic gear train including an input shaft, first-stage and second-stage sun gears, first-stage and second-stage planet gears, first-stage and second-stage carriers, and a ring gear with the first-stage planet carrier splined to the second-stage sun gear;
wherein, in a cold engine start mode, the first clutch is in the engaged position to ground the second-stage planet carrier and the second and third clutches are in the disengaged positions, and further, rotational power from the electric machine moves in the first power flow direction from the input shaft, to the first-stage sun gear, to the first stage-planet gears, to the first-stage planet carrier, to the second-stage sun gear, to the second-stage planet gears, and to the ring gear out to the engine at the first gear ratio; and
wherein, in a warm engine start mode, the second clutch is in the engaged position to ground the first-stage planet carrier and the first and third clutches are in the disengaged positions, and further, the rotational power from the electric machine moves in the first power flow direction from the input shaft, to the first-stage sun gear, to the first stage-planet gears, and to the ring gear out to the engine at the second gear ratio.

12. The combination starter-generator device of claim 11, wherein, in a boost mode, the third clutch is in the engaged position to couple the first-stage planet carrier to the ring gear and the first and second clutches are in the disengaged positions, and further, the rotational power from the electric machine moves in the first power flow direction from the input shaft, to the first-stage and second-stage sun gears, to the first-stage and second-stage planet gears, and to the ring gear out to the engine at the third gear ratio; and wherein, in a generation mode, the third clutch is in the engaged position to couple the first-stage planet carrier to the ring gear and the first and second clutches are in the disengaged positions, and further, rotational power from the engine moves in the second power flow direction from the ring gear, to the first-stage and second-stage planet gears, to the first-stage and second-stage sun gears, and to the input shaft out to the electric machine at the fourth gear ratio.

13. The combination starter-generator device of claim 12, wherein each of the third gear ratio and the fourth gear ratio is a 1:1 ratio through the gear set, and wherein the first gear ratio is greater than the second gear ratio, and the second gear ratio is greater than the third gear ratio.

14. A drivetrain assembly for a work vehicle, comprising:
an engine;
an electric machine;
a gear set configured to receive rotational input from the electric machine and from the engine and to couple the electric machine and the engine in a first power flow direction and a second power flow direction, the gear set configured to operate in one of at least a first gear ratio, a second gear ratio, or a third gear ratio in the first power flow direction and at least the third gear ratio in the second power flow direction;
at least one clutch selectively coupled to the gear set to effect the first, second, and third gear ratios in the first power flow direction and the fourth gear ratio in the second power flow direction;
at least one permanent magnet mounted on the at least one clutch;
an actuator assembly including a cam plate that is generally disc-shaped with a first cam plate face and a second cam plate face, opposite the first cam plate face and oriented towards the at least one clutch, the cam plate including the at least one electromagnet configured selectively shift the at least one clutch between a disengaged position in which the at least one clutch is decoupled from the gear set into an engaged position in which the at least one clutch is coupled to the gear set; and
a controller coupled to the at least one electromagnet to selectively energize the at least one electromagnet in a first energized state to generate an opposite orientation magnetic field relative to the at least one permanent magnet such that the at least one permanent magnet is attracted to the at least one electromagnet and a second energized state to generate a common orientation magnetic field relative to the at least one permanent magnet such that the at least one permanent magnet is repelled by the at least one electromagnet.

15. The drivetrain assembly of claim 14,
wherein the at least one clutch includes the first clutch and the second clutch, each selectively positionable between the engaged position and the disengaged position, and
wherein the at least one electromagnet includes at least one first electromagnet configured to selectively reposition the first clutch between the engaged position and the disengaged position and at least one second electromagnet configured to selectively reposition the second clutch between the engaged position and the disengaged position.

16. The drivetrain assembly of claim 15,
wherein the at least one permanent magnet includes at least one first permanent magnet mounted on the first clutch and positioned proximate to, and cooperating with, the at least one first electromagnet of the cam plate, and at least one second permanent magnet mounted on the second clutch and positioned proximate to, and cooperating with, the at least one second electromagnet of the cam plate;
wherein, when the at least one first electromagnet is energized in the first energized state relative to the at least one first permanent magnet, the first clutch is attracted relative to the cam plate and positioned in the disengaged position, and when the at least one first electromagnet is energized in the second energized state relative to the at least one first permanent magnet, the first clutch is repelled relative to the cam plate and positioned in the engaged position, and
wherein, when the at least one second electromagnet is energized in the first energized state relative to the at least one second permanent magnet, the second clutch is attracted relative to the cam plate and positioned in the disengaged position, and when the at least one second electromagnet is energized in the second energized state relative to the at least one second permanent magnet, the second clutch is repelled relative to the cam plate and positioned in the engaged position.

17. The drivetrain assembly of claim 16,
wherein the first and second clutches are dog clutches and the second clutch is concentrically arranged within the first clutch when the first and the second clutches are in the disengaged positions, and wherein the at least one clutch further includes a third clutch selectively positionable between the engaged position and the disengaged position, the first and second clutches being concentrically arranged within the third clutch when the first and second clutches are in the disengaged positions.

18. The drivetrain assembly of claim 17,
further comprising a housing with a rotatable housing portion and a stationary housing portion, at least portions of the gear set, the first, second, and third clutches, and the actuator assembly being housed within the housing,
wherein the at least one electromagnet further includes at least one third electromagnet positioned proximate to and cooperating with the third clutch, and
wherein the at least one third electromagnet is configured to be energized to attract the third clutch such that the third clutch is positioned in the disengaged position.

19. The drivetrain assembly of claim 17,
wherein the actuator assembly further includes a spring positioned in between the third clutch and the rotatable housing portion, wherein, when the at least one third electromagnet is energized and the third clutch is in the disengaged position, the spring is compressed, and wherein the at least one third electromagnet is configured to be deenergized to release the third clutch such that the spring forces the third clutch towards the gear set into the engaged position.

20. The drivetrain assembly of claim 19, wherein the first clutch includes at least one first clutch tooth, the second clutch includes at least one second clutch tooth, and the third clutch includes at least one third clutch tooth, and wherein, in the respective engaged positions of the first, second, and third clutches, the at least one first tooth, the at least one second tooth, and the at least one third tooth are engaged with the gear set, wherein the gear set includes a compound epicyclic gear train including an input shaft, first-stage and second-stage sun gears, first-stage and second-stage planet gears, first-stage and second-stage carriers, and a ring gear with the first-stage planet carrier splined to the second-stage sun gear, wherein, in a cold engine start mode, the first clutch is in the engaged position to ground the second-stage planet carrier and the second and third clutches are in the disengaged positions, and further, rotational power from the electric machine moves in the first power flow direction from the input shaft, to the first-stage sun gear, to the first stage-planet gears, to the first-stage planet carrier, to the second-stage sun gear, to the second-stage planet gears, and to the ring gear out to the engine at the first gear ratio, wherein, in a warm engine start mode, the second clutch is in the engaged position to ground the first-stage planet carrier and the first and third clutches are in the disengaged positions, and further, the rotational power from the electric machine moves in the first power flow direction from the input shaft, to the first-stage sun gear, to the first stage-planet gears, and to the ring gear out to the engine at the second gear ratio, wherein, in a boost mode, the third clutch is in the engaged position to couple the first-stage planet carrier to the ring gear and the first and second clutches are in the disengaged positions, and further, the rotational power from the electric machine moves in the first power flow direction from the input shaft, to the first-stage and second-stage sun gears, to the first-stage and second-stage planet gears, and to the ring gear out to the engine at the third gear ratio, and wherein, in a generation mode, the third clutch is in the engaged position to couple the first-stage planet carrier to the ring gear and the first and second clutches are in the disengaged positions, and further, rotational power from the engine moves in the second power flow direction from the ring gear, to the first-stage and second-stage planet gears, to the first-stage and second-stage sun gears, and to the input shaft out to the electric machine at the fourth gear ratio.

* * * * *